United States Patent
Jiang et al.

(10) Patent No.: US 10,965,357 B2
(45) Date of Patent: Mar. 30, 2021

(54) METHOD AND DEVICE IN FIRST NODE AND BASE STATION USED FOR WIRELESS COMMUNICATION

(71) Applicants: Qi Jiang, Shanghai (CN); XiaoBo Zhang, Shanghai (CN); Lin Yang, Shanghai (CN)

(72) Inventors: Qi Jiang, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 120 days.

(21) Appl. No.: 16/391,344

(22) Filed: Apr. 23, 2019

(65) Prior Publication Data
US 2019/0326969 A1 Oct. 24, 2019

(30) Foreign Application Priority Data
Apr. 24, 2018 (CN) .......................... 201810372199.9

(51) Int. Cl.
*H04B 7/06* (2006.01)
*H04L 5/00* (2006.01)
*H04B 7/08* (2006.01)

(52) U.S. Cl.
CPC ......... *H04B 7/0617* (2013.01); *H04B 7/0697* (2013.01); *H04B 7/0817* (2013.01); *H04L 5/0005* (2013.01)

(58) Field of Classification Search
CPC .. H04B 7/0617; H04B 7/0697; H04B 7/0817; H04L 5/0005
USPC .......................................................... 375/262
See application file for complete search history.

(56) References Cited

U.S. PATENT DOCUMENTS

| | | | |
|---|---|---|---|
| 2011/0103291 A1* | 5/2011 | Wiberg | H04B 7/15542 370/315 |
| 2013/0044727 A1* | 2/2013 | Nory | H04L 5/0092 370/330 |
| 2014/0206414 A1* | 7/2014 | Oh | H04W 16/28 455/562.1 |

* cited by examiner

*Primary Examiner* — Michael R Neff

(57) ABSTRACT

The present disclosure provides a method and a device in a first node and a base station for wireless communication. A first node transmits K1 first-type reference signal(s), and operates a first radio signal and a second radio signal; the K1 first-type reference signal(s) is(are) transmitted by K1 first-type antenna port set(s) respectively, a target antenna port set is a first-type antenna port set in the K1 first-type antenna port set(s); a first antenna port set and a second antenna port set are respectively used for transmitting the first radio signal and the second radio signal. The disclosure makes it practical for the first node to simultaneously operate radio signals transmitted from different transmitters in beamforming scenarios by connecting a first antenna port set and a second antenna port set with a target antenna port set, thereby improving the reception and transmission efficiency and the entire performance of the system.

20 Claims, 14 Drawing Sheets

METHOD AND DEVICE IN FIRST NODE AND BASE STATION USED FOR WIRELESS COMMUNICATION

CROSS REFERENCE TO RELATED APPLICATION

This application claims the priority benefit of Chinese Patent Application Serial Number CN201810372199.9, filed on Apr. 24, 2018, the full disclosure of which is incorporated herein by reference.

BACKGROUND

Technical Field

The present disclosure relates to transmission methods and devices in wireless communication systems, in particular to a transmission method and a transmission device in wireless relay systems.

Related Art

In traditional 3$^{rd}$ Generation Partner Project (3GPP) Long Term Evolution (LTE) system, a flexible access mode of small cell coverage is realized through an introduction of wireless relay. Relays in Rel-9 and Rel-10 usually employ half-duplex as a working mode. A wireless link between a relay and a UE is defined as an Access Link, and a wireless link between a relay and a base station is defined as a Backhaul Link; considering the problem of self-interference, a relay cannot transmit a radio signal on the Access Link while receiving a radio signal on the Backhaul Link, similarly, a relay cannot receive a radio signal on the Access Link while transmitting a radio signal on the Backhaul Link either.

In Rel-14 and future 5G systems, a working mode of relay based on Integrated Access Backhaul (IAB) will be discussed and introduced into wireless communication systems; in an IAB-based scenario, a same region of frequency band resources will be simultaneously allocated to the Access Link and the Backhaul Link, and the frequency domain resources allocated to the Access Link and the Backhaul Link may be dynamically changed. In the meantime, due to wide application of beamforming in 5G systems, a problem arising from beamforming in IAB system needs to be reconsidered.

SUMMARY

Taking into account the fact that the relay cannot transmit and receive on access link and backhaul link simultaneously in IAB scenarios, a simple Frame Structure design is to orthogonalize backhaul link and access link in time domain, namely, a relay performs transmission and reception on a backhaul link in a given slot set pre-configured by the system, and performs transmission and reception on an access link in slot sets other than the given slot set. The design is advantageous in that it is simple to realize, but the problem is that when dividing time domain resources into multiple pieces, especially when employing the mode of Time Division Duplexing (TDD), the time domain resources is required to be divided into four parts to further differentiate uplink from downlink, thus reducing the entire spectral efficiency and increasing delay of the system.

In view of the above problem and analysis, the present disclosure provides a solution. It should be noted that the embodiments of the UE in the present disclosure and the characteristics in the embodiments may be applied to the base station, and vice versa. Further, the embodiments of the present disclosure and the characteristics may be mutually combined if no conflict is incurred.

The present disclosure provides a method in a first node for wireless communication, comprising:

transmitting K1 first-type reference signal(s); and
operating a first radio signal and a second radio signal;
wherein the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) include a first base station and a first terminal, the first base station and the first terminal are non-co-located; the operating is transmitting, or, the operating is receiving; the K1 is a positive integer.

In one embodiment, the above method is advantageous in that: the first node is a relay, the relay simultaneously operates a first radio signal and a second radio signal; thereby a relay performs reception for both an access link and a backhaul link within a time window, or performs transmission for both an access link and a backhaul link, which increases utilization ratio of time domain resources and finally improves the system spectral efficiency.

In one embodiment, the above method is also advantageous in that: when a relay simultaneously performs operations for both links in a time window, it is necessary to ensure that a transmitting beam employed may be received by a base station and a UE, and that a receiving beam employed may receive radio signals transmitted from a base station and a UE simultaneously; in order to satisfy the above scenario of simultaneous transmission, the first antenna port set and the second antenna port set need to go through processes of selection and optimization; and the K1 first-type reference signal(s) is(are) applied to the above selection and optimization.

In one embodiment, the above method is characterized in that a relay transmits the K1 first-type reference signal(s) so as to determine the target antenna port therein, the target antenna port set helps the relay determine the first antenna port set and the second antenna port set, thus ensuring the relay may operate the first radio signal and the second radio signal at the same time.

According to one aspect of the present disclosure, the above method is characterized in that the operating is transmitting, the phrase that the first antenna port set and the second antenna port set are related to the target antenna port set respectively comprises: any antenna port of the first antenna port set is spatially related to at least one antenna port of the target antenna port set, and any antenna port of the second antenna port set is spatially related to at least one antenna port of the target antenna port set.

In one embodiment, the principle of the above method is that: the first node employs a target antenna port set to transmit the first radio signal and the second radio signal simultaneously, so as to guarantee that a base station and a UE can receive the first radio signal and the second radio signal simultaneously.

According to one aspect of the present disclosure, the above method is characterized in that the operating is receiving, the first radio signal and the second radio signal are transmitted by the first terminal and the first base station respectively; a first spatial Rx (Receive) parameter and a second spatial Rx parameter are used for receiving the first radio signal and the second radio signal respectively; the phrase that the first antenna port set and the second antenna port set are related to the target antenna port set respectively comprises: the first spatial Rx parameter and the second spatial Rx parameter are associated to the target antenna port set respectively.

In one embodiment, the principle of the above method is that: the first terminal and the first base station respectively determine the first antenna port set and the second antenna port set based on a radio signal transmitted by the target antenna port set, which means determining a transmission beamforming vector based on a reception beamforming vector; and the first node determines the first spatial Rx parameter and the second spatial Rx parameter based on the target antenna port set, which means determining a reception beamforming vector based on a transmission beamforming vector; then the first terminal and the first base station transmit the first radio signal and the second radio signal respectively employing the first antenna port set and the second antenna port set, and the first node simultaneously employs the first spatial Rx parameter and the second spatial Rx parameter to receive the first radio signal and the second radio signal respectively.

According to one aspect of the present disclosure, the above method comprises:
transmitting a first signaling; and
receiving a second signaling;
wherein the first signaling indicates the first antenna port set; the second signaling indicates the second antenna port set; the first signaling comprises a first configuration parameter group, the first configuration parameter group is related to the first radio signal; the second signaling comprises a second configuration parameter group, the second configuration group is related to the second radio signal.

In one embodiment, the above method is characterized in that the first signaling is a scheduling for the first radio signal, the second signaling is a scheduling for the second radio signal; the first node simultaneously transmits the first radio signal and the second radio signal.

According to one aspect of the present disclosure, the above method comprises:
transmitting a third signaling; and
receiving a fourth signaling;
wherein the third signaling indicates the first antenna port set, the fourth signaling indicates the second antenna port set; the third signaling comprises a third configuration parameter group, the third configuration parameter group is related to the first radio signal; the fourth signaling comprises a fourth configuration parameter group, the fourth configuration parameter group is related to the second radio signal.

In one embodiment, the above method is characterized in that the third signaling is a scheduling for the first radio signal, the fourth signaling is a scheduling for the second radio signal; the first node simultaneously receives the first radio signal and the second radio signal.

According to one aspect of the present disclosure, the above method comprises:
receiving a third radio signal;
wherein the third radio signal is used for generating at least one of the target antenna port set, or the first antenna port set; a transmitter of the third radio signal is the first terminal.

In one embodiment, the above method is advantageous in that: the third radio signal is a feedback from a UE about multi-antenna transmission and reception, the method that the third radio signal is used for determining at least one of the target antenna port set, or the first antenna port set is aimed at ensuring a beamforming vector employed for transmission on a backhaul link will first take into account a beamforming vector on an access link, so as to guarantee the performance on an access link.

According to one aspect of the present disclosure, the above method comprises:
transmitting a fourth radio signal;
wherein the fourth radio signal is used for indicating a candidate antenna port set, the candidate antenna port set is a first-type antenna port set of the K1 first-type antenna port set(s), the candidate antenna port set is related to the first antenna port set; or the fourth radio signal is used for indicating a third antenna port set, the third antenna port set is a second-type antenna port set of K2 second-type antenna port set(s), the target antenna port set is related to the third antenna port set; a receiver of the fourth radio signal comprises the first base station; the K2 is a positive integer.

In one embodiment, the above method is characterized in that: a relay determines the first antenna port set based on a third radio signal transmitted from a UE, and transmits the information of the first antenna port set to a base station via the fourth radio signal; the above method is aimed at determining a beamforming vector for a backhaul link by a beamforming vector for an access link.

In one embodiment, the above method is further characterized in that: a relay determines the third antenna port set by receiving a reference signal from a base station, and determines the target antenna port set based on the third antenna port set; the above method is aimed at determining a beamforming vector for an access link by a beamforming vector for a backhaul link.

According to one aspect of the present disclosure, the above method comprises:
receiving K2 second-type reference signal(s);
wherein the K2 second-type reference signal(s) is(are) transmitted by the K2 second-type antenna port set(s) respectively; a transmitter of the K2 second-type reference signal(s) is the first base station.

In one embodiment, the above method is advantageous in that: a relay receives K2 second-type reference signal(s) transmitted from a base station to determine a beamforming vector employed on a backhaul link, and then determines a beamforming vector for an access link based on a beamforming vector on a backhaul link.

According to one aspect of the present disclosure, the above method comprises:
receiving first information;
wherein the first information is used for indicating K1 first-type time-frequency resource set(s), the K1 first-type time-frequency resource set(s) is(are) occupied by K1 first-type reference signal(s) respectively; the first information is transmitted via an air interface.

According to one aspect of the present disclosure, the above method comprises:
receiving second information;
wherein the second information is used for determining a target time unit set, the target time unit set comprises M1 target time unit(s), a first time unit is a target time unit of the M1 target time unit(s); time-domain resources occupied by the first radio signal and the second radio signal belong to the first time unit; the second information is transmitted via an air interface; the M1 is a positive integer.

The present disclosure provides a method in a first terminal for wireless communication, comprising:

receiving K1 first-type reference signal(s); and processing a first radio signal;

wherein the K1 first-type reference signal(s) is(are) transmitted by K1 first-type antenna port set(s) respectively, a target antenna port set is a first-type antenna port set of the K1 first-type antenna port set(s); a first antenna port set is used for transmitting the first radio signal; the first antenna port set is related to the target antenna port set; the processing is receiving, or, the processing is transmitting; the K1 is a positive integer.

According to one aspect of the present disclosure, the above method is characterized in that the processing is receiving, the phrase that the first antenna port set is related to the target antenna port set comprises: any one antenna port of the first antenna port set is spatially related to at least one antenna port of the target antenna port set; a transmitter of the first radio signal is a first node.

According to one aspect of the present disclosure, the above method is characterized in that the processing is transmitting, a first spatial Rx parameter is used for receiving the first radio signal; the phrase that the first antenna port set is related to the target antenna port set comprises: the first spatial Rx parameter is associated to the target antenna port set; a receiver of the first radio signal comprises a first node.

According to one aspect of the present disclosure, the above method comprises:

receiving a first signaling;

wherein the first signaling indicates the first antenna port set, the first signaling comprises a first configuration parameter group, the first configuration parameter group is related to the first radio signal.

According to one aspect of the present disclosure, the above method comprises:

receiving a third signaling;

wherein the third signaling indicates the first antenna port set, the third signaling comprises a third configuration parameter group, the third configuration parameter group is related to the first radio signal.

According to one aspect of the present disclosure, the above method comprises:

transmitting a third radio signal;

wherein the third radio signal is used for generating at least one of the target antenna port set, or the first antenna port set; a receiver of the third radio signal comprises the first node.

The present disclosure provides a method in a first base station for wireless communication, comprising:

receiving K1 first-type reference signal(s); and processing a second radio signal;

wherein the K1 first-type reference signal(s) is(are) transmitted by K1 first-type antenna port set(s) respectively, a target antenna port set is a first-type antenna port set of the K1 first-type antenna port set(s); a second antenna port set is used for transmitting the second radio signal; the second antenna port set is related to the target antenna port set; the processing is receiving, or, the processing is transmitting; the K1 is a positive integer.

According to one aspect of the present disclosure, the above method is characterized in that the processing is receiving, the phrase that the second antenna port set is related to the target antenna port set comprises: any one antenna port of the second antenna port set is spatially related to at least one antenna port of the target antenna port set.

According to one aspect of the present disclosure, the above method is characterized in that the processing is transmitting; a second spatial Rx parameter is used for receiving the second radio signal; the phrase that the second antenna port set is related to the target antenna port set comprises: the second spatial Rx parameter is associated to the target antenna port set.

According to one aspect of the present disclosure, the above method comprises:

transmitting a second signaling;

wherein the second signaling indicates the second antenna port set, the second signaling comprises a second configuration parameter group, the second configuration parameter group is related to the second radio signal.

According to one aspect of the present disclosure, the above method comprises:

transmitting a fourth signaling;

wherein the fourth signaling indicates the second antenna port set, the fourth signaling comprises a fourth configuration parameter group, the fourth configuration parameter group is related to the second radio signal.

According to one aspect of the present disclosure, the above method comprises:

receiving a fourth radio signal;

wherein the fourth radio signal is used for indicating a candidate antenna port set, the candidate antenna port set is a first-type antenna port set of the K1 first-type antenna port set(s), the candidate antenna port set is related to the first antenna port set; or the fourth radio signal is used for indicating a third antenna port set, the third antenna port set is a second-type antenna port set of K2 antenna port set(s), the target antenna port set is related to the third antenna port set; a transmitter of the fourth radio signal is a first node; the K2 is a positive integer.

According to one aspect of the present disclosure, the above method comprises:

transmitting K2 second-type reference signal(s);

wherein the K2 second-type reference signal(s) is(are) transmitted by the K2 second-type antenna port set(s) respectively; a receiver of the K2 second-type reference signal(s) comprises a first node.

According to one aspect of the present disclosure, the above method comprises:

transmitting first information;

wherein the first information is used for indicating K1 first-type time-frequency resource set(s), the K1 first-type time-frequency resource set(s) is(are) occupied by the K1 first-type reference signal(s) respectively; the first information is transmitted via an air interface; a receiver of the first information comprises a first node.

According to one aspect of the present disclosure, the above method comprises:

transmitting second information;

wherein the second information is used for determining a target time unit set, the target time unit set comprises M1 target time unit(s), a first time unit is a target time unit of the M1 target time unit(s); time-domain resources occupied by the first radio signal and the second radio signal belong to the first time unit; the second information is transmitted via an air interface; a receiver of the second information comprises a first node; the M1 is a positive integer.

The present disclosure provides a first node used for wireless communication, comprising:

a first transceiver, transmitting K1 first-type reference signal(s); and a second transceiver, operating a first radio signal and a second radio signal;

wherein the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) include a first base station and a first terminal, the first base station and the first terminal are non-co-located; the operating is transmitting, or, the operating is receiving; the K1 is a positive integer.

In one embodiment, the above first node for wireless communication is characterized in that the operating is transmitting, the phrase that the first antenna port set and the second antenna port set are related to the target antenna port set respectively comprises: any antenna port of the first antenna port set is spatially related to at least one antenna port of the target antenna port set, and any antenna port of the second antenna port set is spatially related to at least one antenna port of the target antenna port set.

In one embodiment, the above first node for wireless communication is characterized in that the operating is receiving, the first radio signal and the second radio signal are respectively transmitted by the first terminal and the first base station; a first spatial Rx parameter and a second spatial Rx parameter are respectively used for receiving the first radio signal and the second radio signal; the phrase that the first antenna port set and the second antenna port set are related to the target antenna port set respectively comprises: the first spatial Rx parameter and the second spatial Rx parameter are associated to the target antenna port set respectively.

In one embodiment, the above first node for wireless communication is characterized in that the second transceiver further transmits a first signaling, and receives a second signaling; the first signaling indicates the first antenna port set; the second signaling indicates the second antenna port set; the first signaling comprises a first configuration parameter group, the first configuration parameter group is related to the first radio signal; the second signaling comprises a second configuration parameter group, the second configuration parameter group is related to the second radio signal.

In one embodiment, the above first node for wireless communication is characterized in that the second transceiver further transmits a third signaling, and receives a fourth signaling; the third signaling indicates the first antenna port set; the fourth signaling indicates the second antenna port set; the third signaling comprise a third configuration parameter group, the third configuration parameter group is related to the first radio signal; the fourth signaling comprises a fourth configuration parameter group, the fourth configuration parameter group is related to the second radio signal.

In one embodiment, the above first node for wireless communication is characterized in that the first transceiver further receives a third radio signal; the third radio signal is used for generating at least one of the target antenna port set, or the first antenna port set; a transmitter of the third radio signal is the first terminal.

In one embodiment, the above first node for wireless communication is characterized in that the first transceiver further transmits a fourth radio signal; the fourth radio signal is used for indicating a candidate antenna port set, the candidate antenna port set is a first-type antenna port set of the K1 first-type antenna port set(s), the candidate antenna port set is related to the first antenna port set; or the fourth radio signal is used for indicating a third antenna port set, the third antenna port set is a second-type antenna port set of K2 second-type antenna port set(s), the target antenna port set is related to the third antenna port set; a receiver of the fourth radio signal comprises the first base station.

In one embodiment, the above first node for wireless communication is characterized in that the first transceiver further receives K2 second-type reference signal(s); the K2 second-type reference signal(s) is(are) transmitted by the K2 second-type antenna port set(s) respectively; a transmitter of the K2 second-type reference signal(s) is the first base station.

In one embodiment, the above first node for wireless communication is characterized in that the first transceiver further receives first information; the first information is used for indicating K1 first-type time-frequency resource set(s), the K1 first-type time-frequency resource set(s) is(are) occupied by the K1 first-type reference signal(s) respectively; the first information is transmitted via an air interface.

In one embodiment, the above first node for wireless communication is characterized in that the first transceiver further receives second information; the second information is used for determining a target time unit set, the target time unit set comprises M1 target time unit(s), a first time unit is a target time unit of the M1 target time unit(s); time-domain resources occupied by the first radio signal and the second radio signal belong to the first time unit; the second information is transmitted via an air interface.

The present disclosure provides a first terminal for wireless communication, comprising:
 a third transceiver, receiving K1 first-type reference signal(s); and
 a fourth transceiver, processing a first radio signal;
 wherein the K1 first-type reference signal(s) is(are) transmitted by K1 first-type antenna port set(s) respectively, a target antenna port set is a first-type antenna port set of the K1 first-type antenna port set(s); a first antenna port set is used for transmitting the first radio signal; the first antenna port set is related to the target antenna port set; the processing is receiving, or, the processing is transmitting; the K1 is a positive integer.

In one embodiment, the above first terminal for wireless communication is characterized in that the processing is receiving, the phrase that the first antenna port set is related to the target antenna port set comprises: any one antenna port of the first antenna port set is spatially related to at least one antenna port of the target antenna port set; a transmitter of the first radio signal is a first node.

In one embodiment, the above first terminal for wireless communication is characterized in that the processing is transmitting, a first spatial Rx parameter is used for receiving the first radio signal; the phrase that the first antenna port set is related to the target antenna port set comprises: the first spatial Rx parameter is associated to the target antenna port set; a receiver of the first radio signal comprises a first node.

In one embodiment, the above first terminal for wireless communication is characterized in that the fourth transceiver further receives a first signaling; the first signaling indicates the first antenna port set, the first signaling comprises a first configuration parameter group, the first configuration parameter group is related to the first radio signal; the first terminal receives the first radio signal.

In one embodiment, the above first terminal for wireless communication is characterized in that the fourth transceiver further receives a third signaling; the third signaling indicates the first antenna port set, the third signaling comprises a third configuration parameter group, the third configuration parameter group is related to the first radio signal; the first terminal transmits the first radio signal.

In one embodiment, the above first terminal for wireless communication is characterized in that the third transceiver further transmits a third radio signal; the third radio signal is used for generating at least one of the target antenna port set, or the first antenna port set; a receiver of the third radio signal comprises the first node.

The present disclosure provides a first base station for wireless communication, comprising:

a fifth transceiver, receiving K1 first-type reference signal(s); and a sixth transceiver, processing a second radio signal;

wherein the K1 first-type reference signal(s) is(are) transmitted by K1 first-type antenna port set(s) respectively, a target antenna port set is a first-type antenna port set of the K1 first-type antenna port set(s); a second antenna port set is used for transmitting the second radio signal; the second antenna port set is related to the target antenna port set; the processing is receiving, or, the processing is transmitting; the K1 is a positive integer.

In one embodiment, the above first base station for wireless communication is characterized in that the processing is receiving, the phrase that the second antenna port set is related to the target antenna port set comprises: any one antenna port of the second antenna port set is spatially related to at least one antenna port of the target antenna port set.

In one embodiment, the above first base station for wireless communication is characterized in that the processing is transmitting; a second spatial Rx parameter is used for receiving the second radio signal; the phrase that the second antenna port set is related to the target antenna port set comprises: the second spatial Rx parameter is associated to the target antenna port set.

In one embodiment, the above first base station for wireless communication is characterized in that the sixth transceiver further transmits a second signaling; the second signaling indicates the second antenna port set, the second signaling comprises a second configuration parameter group, the second configuration parameter group is related to the second radio signal; the first base station receives the second radio signal.

In one embodiment, the above first base station for wireless communication is characterized in that the sixth transceiver further transmits a fourth signaling; the fourth signaling indicates the second antenna port set, the fourth signaling comprises a fourth configuration parameter group, the fourth configuration parameter group is related to the second radio signal; the first base station transmits the second radio signal.

In one embodiment, the above first base station for wireless communication is characterized in that the fifth transceiver further receives a fourth radio signal; the fourth radio signal is used for indicating a candidate antenna port set, the candidate antenna port set is a first-type antenna port set of the K1 first-type antenna port set(s), the candidate antenna port set is related to the first antenna port set; or the fourth radio signal is used for indicating a third antenna port set, the third antenna port set is a second-type antenna port set of K2 antenna port set(s), the target antenna port set is related to the third antenna port set; a transmitter of the fourth radio signal is a first node.

In one embodiment, the above first base station for wireless communication is characterized in that the fifth transceiver further transmits K2 second-type reference signal(s); the K2 second-type reference signal(s) is(are) transmitted by the K2 second-type antenna port set respectively; a receiver of the K2 second-type reference signal(s) comprises a first node.

In one embodiment, the above first base station for wireless communication is characterized in that the fifth transceiver further transmits first information; the first information is used for indicating K1 first-type time-frequency resource set(s), the K1 first-type time-frequency resource set(s) is(are) occupied by the K1 first-type reference signal(s) respectively; the first information is transmitted via an air interface; a receiver of the first information comprises a first node.

In one embodiment, the above first base station for wireless communication is characterized in that the fifth transceiver further transmits second information; the second information is used for determining a target time unit set, the target time unit set comprises M1 target time unit(s), a first time unit is a target time unit of the M1 target time unit(s); time-domain resources occupied by the first radio signal and the second radio signal belong to the first time unit; the second information is transmitted via an air interface; a receiver of the second information comprises a first node.

In one embodiment, the present disclosure has the following advantages over conventional schemes:

the scheme herein enables a relay to operate a first radio signal and a second radio signal simultaneously; thereby a relay can perform reception for an access link and reception for a backhaul link simultaneously in a time window, or perform transmission for an access link and transmission for a backhaul link simultaneously, thus enhancing utilization ratio of time domain resources, and further improving the system spectral efficiency.

a relay transmits K1 first-type reference signal(s) so as to determine the target antenna port therein, the target antenna port set helps the relay determine the first antenna port set and the second antenna port set, thus ensuring the relay may operate the first radio signal and the second radio signal at the same time.

a UE is designed to transmit a third radio signal to a relay, the third radio signal is a feedback from a UE about multi-antenna transmission and reception, the method that the third radio signal is used for determining at least one of the target antenna port set, or the first antenna port set is aimed at ensuring a beamforming vector employed for transmission on a backhaul link will first take into account a beamforming vector on an access link, so as to guarantee the performance on an access link.

since the scheme of simultaneous transmission and reception by the relay is under restrictions of a beamforming vector, a target time unit set is designed to configure the simultaneous reception or simultaneous transmission in the scheme onto part of time-domain resources, thus improving flexibility and robustness of the system.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
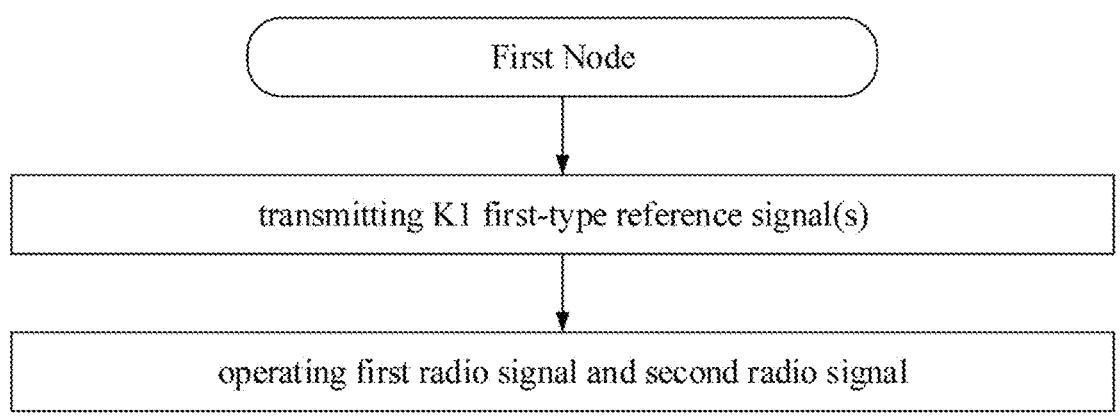
FIG. 1 is a flowchart of K1 first-type reference signal(s) according to one embodiment of the present disclosure.

Embodiment 1 illustrates a flowchart of K1 first-type reference signal(s), as shown in FIG. 1.

In Embodiment 1, the first node of the present disclosure first transmits K1 first-type reference signal(s); and then operates a first radio signal and a second signal; the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) include a first base station and a first terminal, the first base station and the first terminal are non-co-located; the operating action is transmitting, or, the operating action is receiving; the K1 is a positive integer.

In one subembodiment, each of the first antenna port set, the second antenna port set and the target antenna port set comprises a positive integer number of antenna port(s) respectively.

In one subembodiment, the first antenna port set comprises multiple antenna ports, the second antenna port set comprises multiple antenna ports, and the target antenna port set only comprises one antenna port.

In one subembodiment, there is at least one multicarrier symbol occupied by the first radio signal and the second radio signal simultaneously.

In one subembodiment, the multicarrier symbol of the present disclosure is one of Orthogonal Frequency Division Multiplexing (OFDM) symbol, Single-Carrier Frequency Division Multiple Access (SC-FDMA) symbol, Filter Bank Multi Carrier (FBMC) symbol, Cyclic Prefix (CP)-included OFDM symbol, and CP-included Discrete Fourier Transform Spreading Orthogonal Frequency Division Multiplexing (DFT-s-OFDM) symbol.

In one subembodiment, the first node is a relay.

In one subembodiment, the first node is a Transmission Reception Point (TRP), the first node and the first base station are in communication via a wireless link.

In one subembodiment, the first node is a UE with radio signal relay function.

In one subembodiment, the first node is a UE with radio signal reception and retransmission functions.

In one subembodiment, the K1 first-type reference signal(s) is(are) K1 Channel State Information Reference Signal(s) (CSI-RS(s)).

In one subembodiment, the K1 first-type reference signal(s) is(are) K1 Sounding Reference Signal(s) (SRS(s)).

Embodiment 2

Figure 2:
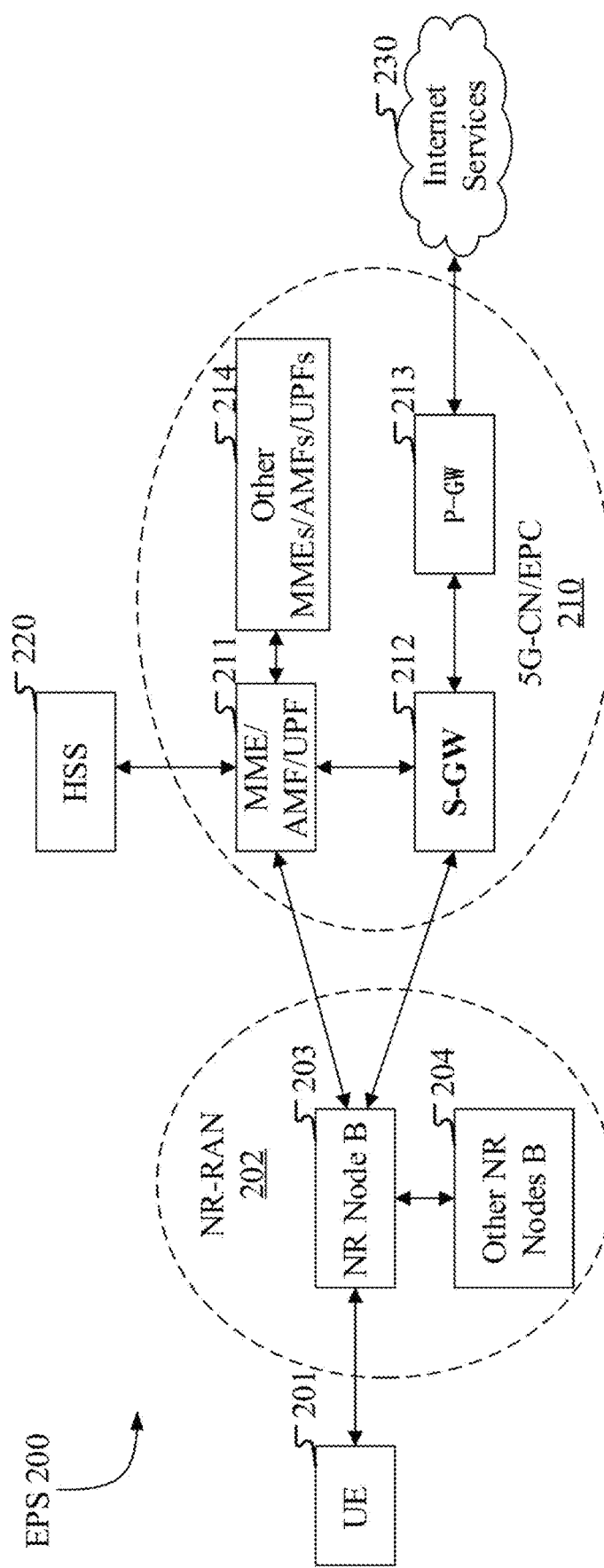
FIG. 2 is a schematic diagram illustrating a network architecture according to one embodiment of the present disclosure.

Embodiment 2 illustrates a schematic diagram of a network architecture, as shown in FIG. 2.

Embodiment 2 illustrates an example of a diagram of a network architecture according to the present disclosure, as shown in FIG. 2. FIG. 2 is a schematic diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or other applicable terms. The EPS 200 may comprise one or more UEs 201, an NG-RAN 202, a 5G-Core Network/Evolved Packet Core (5G-CN/EPC) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BBS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, non-ground base station communications, Satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1/NG interface. The 5G-CN/EPC 210 comprises a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 comprises IP services corresponding to operators, specifically including Internet, Intranet, IP Multimedia Subsystems (IMSs) and Packet Switching Streaming Services (PSSs).

In one subembodiment, the UE 201 corresponds to the first node in the present disclosure.

In one subembodiment, the gNB 203 corresponds to the first base station in the present disclosure.

In one subembodiment, the UE 201 corresponds to the first terminal in the present disclosure.

In one subembodiment, the gNB 203 corresponds to the first node in the present disclosure.

In one subembodiment, the UE 201 is a terminal supporting radio relay function.

In one subembodiment, the gNB 203 is a base station supporting radio relay function.

Embodiment 3

Figure 3:
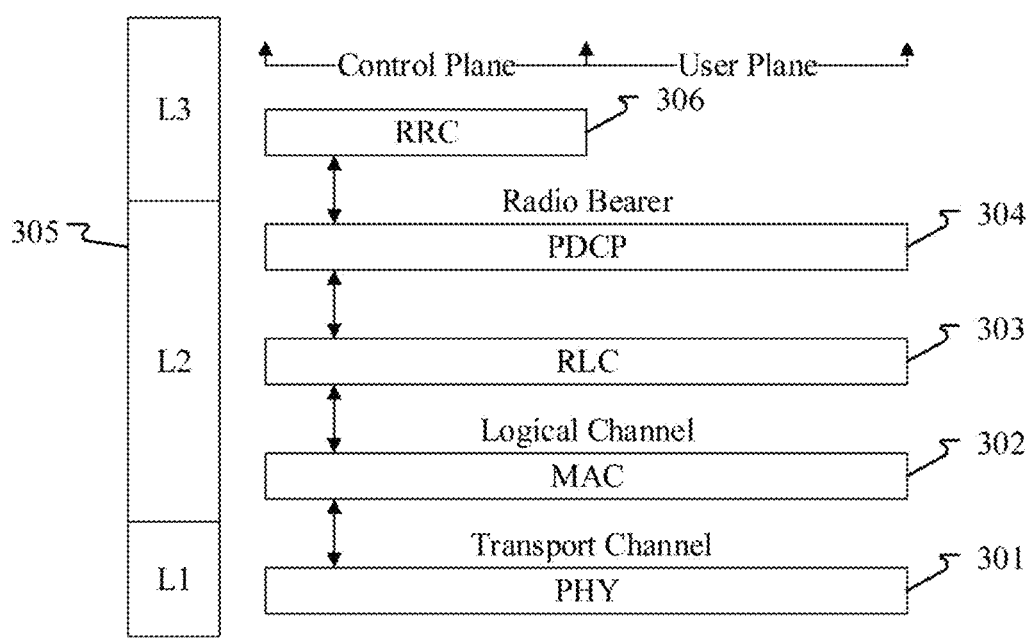
FIG. 3 is a schematic diagram illustrating a radio protocol architecture of a user plane and a control plane according to one embodiment of the present disclosure.

Embodiment 3 illustrates a diagram of a radio protocol architecture of a user plane and a control plane according to the present disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a layer 1, a layer 2 and a layer 3 respectively. The layer 1 (L1) 301 is the lowest layer and performs signal processing functions of the PHY layer. The L1 layer is called PHY 301 in this disclosure. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet to as to compensate the disordered receiving caused by Hybrid Automatic Repeat Request (HARQ). The MAC sublayer 302 provides multiplexing between a logical channel and a transport channel. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one subembodiment, the radio protocol architecture in FIG. 3 is applicable to the first node in the present disclosure.

In one subembodiment, the radio protocol architecture in FIG. 3 is applicable to the first terminal in the present disclosure.

In one subembodiment, the radio protocol architecture in FIG. 3 is applicable to the first base station in the present disclosure.

In one subembodiment, the first signaling in the present disclosure is generated by the PHY 301.

In one subembodiment, the second signaling in the present disclosure is generated by the PHY 301.

In one subembodiment, the third signaling in the present disclosure is generated by the PHY 301.

In one subembodiment, the fourth signaling in the present disclosure is generated by the PHY 301.

In one subembodiment, the first radio signal in the present disclosure is generated by the PHY 301.

In one subembodiment, the first radio signal in the present disclosure is generated by the MAC sublayer 302.

In one subembodiment, the second radio signal in the present disclosure is generated by the PHY 301.

In one subembodiment, the second radio signal in the present disclosure is generated by the MAC sublayer 302.

In one subembodiment, the third radio signal in the present disclosure is generated by the PHY 301.

In one subembodiment, the fourth radio signal in the present disclosure is generated by the PHY 301.

In one subembodiment, the first information in the present disclosure is generated by the RRC sublayer 306.

In one subembodiment, the second information in the present disclosure is generated by the RRC sublayer 306.

Embodiment 4

Figure 4:
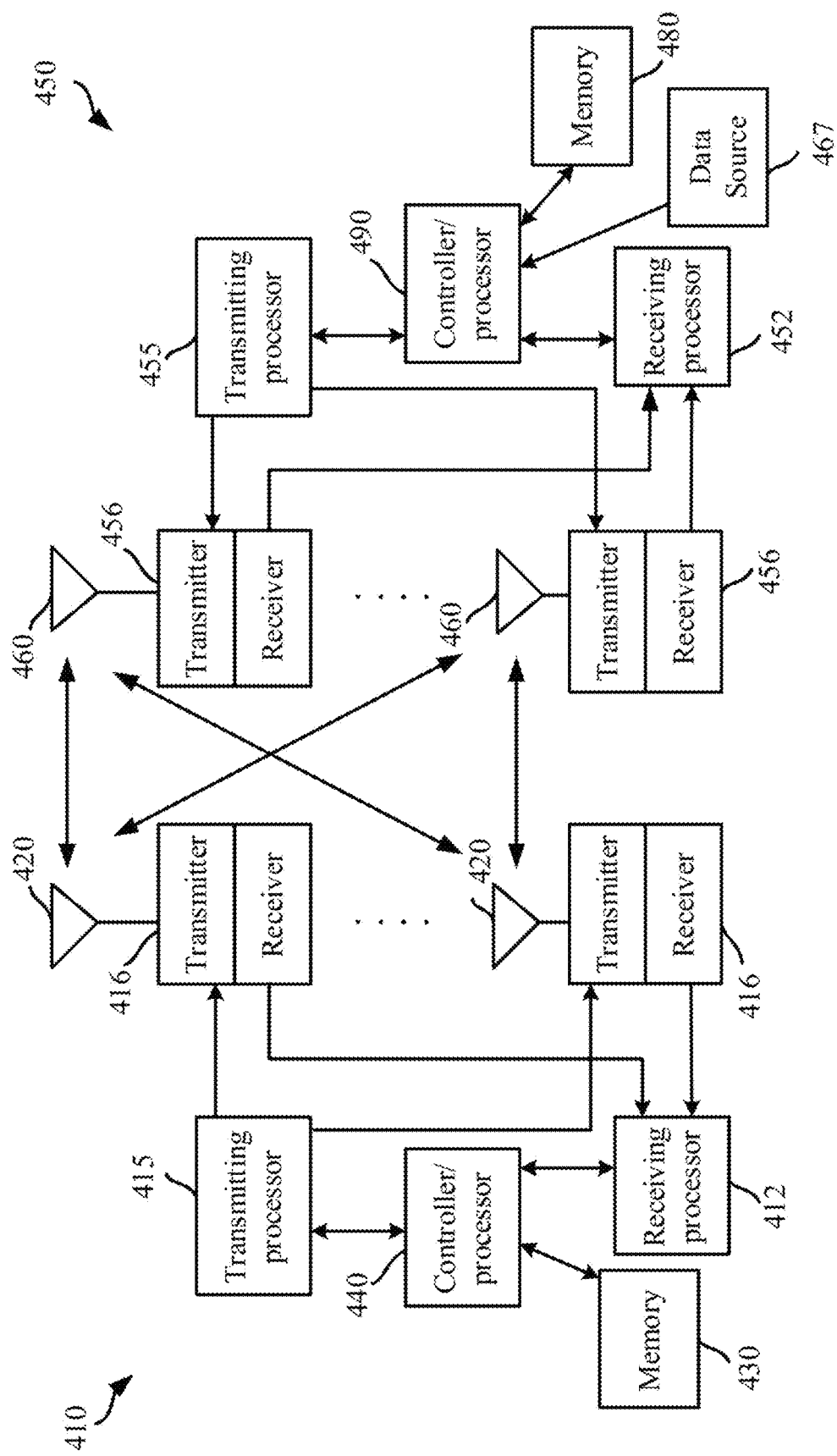
FIG. 4 is a schematic diagram of an evolved node and a UE according to one embodiment of the present disclosure.

Embodiment 4 illustrates a schematic diagram of a base station and a UE according to the present disclosure, as shown in FIG. 4. FIG. 4 is a block diagram of a UE 450 and a gNB 410 that are in communication with each other in an access network.

The base station (410) comprises a controller/processor 440, a memory 430, a receiving processor 412, a transmitting processor 415, a transmitter/receiver 416 and an antenna 420.

The UE (450) comprises a controller/processor 490, a memory 480, a data source 467, a transmitting processor 455, a receiving processor 452, a transmitter/receiver 456 and an antenna 460.

In Uplink (UL) transmission, processes relevant to the base station 410 include the following:

The receiver 416 receives a radio frequency signal via a corresponding antenna 420, converts the received radio frequency signal into a baseband signal and provides the baseband signal to the receiving processor 412;

The receiving processor 412 performs signal receiving processing functions of the L1 layer (that is, PHY), including decoding, de-interleaving, descrambling, demodulation and extraction of physical layer control signaling;

The receiving processor 412 performs signal receiving processing functions of the L1 layer (that is, PHY), including multi-antenna reception, despreading, code division multiplexing and precoding;

The controller/processor 440 performs functions of the L2 layer, and is connected to the memory 430 that stores program codes and data;

The controller/processor 440 provides multiplexing between a transport channel and a logical channel, packet reassembling, decryption, header decompression, and control signal processing so as to recover a higher-layer packet from the UE 450; a higher-layer packet coming from the controller/processor 440 can be provided to a core network;

In UL transmission, processes relevant to the UE 450 include the following:

The data source 467 provides a higher-layer packet to the controller/processor 490. The data source 467 represents all protocol layers above the L2 layer;

The transmitter 456 transmits a radio frequency signal via a corresponding antenna 460, converting a baseband signal into a radio frequency signal, and provides the radio frequency signal to the corresponding antenna 460;

The transmitting processor 455 performs signal receiving functions of the L1 layer (that is, PHY), including encoding, interleaving, scrambling, modulation and generation of physical layer signaling;

The transmitting processor 455 performs signal receiving functions of the L1 layer (that is, PHY), including multi-antenna transmission, spreading, code division multiplexing and precoding;

The controller/processor 490, based on radio resources allocation for the gNB 410, performs header compression, encryption, packet segmentation and reordering, and multiplexing between a logical channel and a transport channel, so as to implement functions of the L2 layer on the user plane and the control plane;

The controller/processor 490 is also in charge of HARQ operation, retransmission of a lost packet and a signaling to the gNB 410;

In Downlink (DL) transmission, processes relevant to the base station 410 include the following:

A packet from a higher layer is provided to the controller/processor 440. The controller/processor 440 provides header compression, encryption, packet segmentation and reordering, and multiplexing and de-multiplexing between a logical channel and a transport channel, so as to implement the L2 protocol used for the user plane and control plane; the higher-layer packet may include data or control information, for example, Downlink Shared Channel (DL-SCH);

The controller/processor 440 is connected to the memory 430 that stores program codes and data. The memory 430 may be a computer readable medium;

The controller/processor 440 includes a scheduling unit for a transmission requirement, and the scheduling unit is configured to schedule an aerial resource corresponding to the transmission requirement;

The transmitting processor 415 receives a bit stream output from the controller/processor 440, and performs signal transmitting processing functions of an L1 layer (that is, PHY), including encoding, interleaving, scrambling, modulation, power control/allocation, generation of physical layer control signaling (including PBCH, PDCCH, PHICH, PCFICH, reference signal), etc.

The transmitting processor 415 receives a bit stream output from the controller/processor 440, and performs signal transmitting processing functions of an L1 layer (that is, PHY), including multi-antenna transmission, spreading, code division multiplexing and precoding;

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following:

The receiver 456 is configured to convert a radio-frequency signal received via the antenna 460 into a baseband signal and provide the baseband signal to the receiving processor 452.

The receiving processor 452 performs signal receiving processing functions of an L1 layer (that is, PHY), including decoding, de-interleaving, descrambling, demodulation, extraction of physical layer control signaling, etc.

The receiving processor 452 performs signal receiving processing functions of an L1 layer (that is, PHY), including multi-antenna reception, dispreading, code division multiplexing and precoding.

The controller/processor 490 receives a bit stream output from the receiving processor 452, and provides header decompression, decryption, packet segmentation and reordering, multiplexing and de-multiplexing between a logical channel and a transport channel, to implement the L2 protocol used for the user plane and the control plane.

The controller/processor 490 is connected to the memory 480 that stores program codes and data. The memory 480 may be a computer readable medium.

In one subembodiment, the UE 450 corresponds to the first node in the present disclosure. The UE 450 comprises at least one processor and at least one memory. The at least one memory includes computer program codes. The at least one memory and the computer program codes are configured to be used in collaboration with the at least one processor. The UE 450 at least transmits K1 first-type reference signal(s); and operates a first radio signal and a second radio signal; the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) include a first base station and a first terminal, the first base station and the first terminal are non-co-located; the operating is transmitting, or, the operating is receiving; the K1 is a positive integer.

In one subembodiment, the UE 450 corresponds to the first node in the present disclosure. The UE 450 comprises a memory that stores a computer readable instruction program. The computer readable instruction program generates an action when executed by at least one processor. The action includes transmitting K1 first-type reference signal(s); and operating a first radio signal and a second radio signal; the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) include a first base station and a first terminal, the first base station and the first terminal are non-co-located; the operating is transmitting, or, the operating is receiving; the K1 is a positive integer.

In one subembodiment, the UE 450 corresponds to the first terminal in the present disclosure. The UE 450 comprises at least one processor and at least one memory. The at least one memory includes computer program codes. The at least one memory and the computer program codes are configured to be used in collaboration with the at least one processor. The UE 450 at least receives K1 first-type reference signal(s); and operates a first radio signal; the K1 first-type reference signal(s) is(are) transmitted by K1 first-type antenna port set(s) respectively, a target antenna port set is a first-type antenna port set of the K1 first-type antenna port set(s); a first antenna port set is used for transmitting the first radio signal; the first antenna port set is related to the target antenna port set; the processing is receiving, or, the processing is transmitting; the K1 is a positive integer.

In one subembodiment, the UE 450 corresponds to the first terminal in the present disclosure. The UE 450 comprises a memory that stores a computer readable instruction program. The computer readable instruction program generates an action when executed by at least one processor. The action includes receiving K1 first-type reference signal(s); and operating a first radio signal; the K1 first-type reference signal(s) is(are) transmitted by K1 first-type antenna port set(s) respectively, a target antenna port set is a first-type antenna port set of the K1 first-type antenna port set(s); a first antenna port set is used for transmitting the first radio signal; the first antenna port set is related to the target antenna port set; the processing is receiving, or, the processing is transmitting; the K1 is a positive integer.

In one subembodiment, the gNB 410 corresponds to the first node in the present disclosure. The gNB 410 comprises at least one processor and at least one memory. The at least one memory includes computer program codes. The at least one memory and the computer program codes are configured to be used in collaboration with the at least one processor. The gNB 410 at least transmits K1 first-type reference signal(s); and operates a first radio signal and a second radio signal; the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) include a first base station and a first terminal, the first base station and the first terminal are non-co-located; the operating is transmitting, or, the operating is receiving; the K1 is a positive integer.

In one subembodiment, the gNB 410 corresponds to the first node in the present disclosure. The gNB 410 comprises a memory that stores a computer readable instruction program. The computer readable instruction program generates an action when executed by at least one processor. The action includes transmitting K1 first-type reference signal(s); and operating a first radio signal and a second radio signal; the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) include a first base station and a first terminal, the first base station and the first terminal are non-co-located; the operating is transmitting, or, the operating is receiving; the K1 is a positive integer.

In one subembodiment, the gNB 410 corresponds to the first base station in the present disclosure. The gNB 410 comprises at least one processor and at least one memory. The at least one memory includes computer program codes. The at least one memory and the computer program codes are configured to be used in collaboration with the at least one processor. The gNB 410 at least receives K1 first-type reference signal(s); and operates a second radio signal; the K1 first-type reference signal(s) is(are) transmitted by K1 first-type antenna port set(s) respectively, a target antenna port set is a first-type antenna port set of the K1 first-type antenna port set(s); a second antenna port set is used for transmitting the second radio signal; the second antenna port set is related to the target antenna port set; the processing is receiving, or, the processing is transmitting; the K1 is a positive integer.

In one subembodiment, the gNB 410 corresponds to the first base station in the present disclosure. The gNB 410 comprises a memory that stores a computer readable instruction program. The computer readable instruction program generates an action when executed by at least one processor. The action includes receiving K1 first-type reference signal(s); and operating a second radio signal; the K1 first-type reference signal(s) is(are) transmitted by K1 first-type antenna port set(s) respectively, a target antenna port set is a first-type antenna port set of the K1 first-type antenna port set(s); a second antenna port set is used for transmitting the second radio signal; the second antenna port set is related to the target antenna port set; the processing is receiving, or, the processing is transmitting; the K1 is a positive integer.

In one subembodiment, the UE 450 corresponds to a first terminal in the present disclosure, and the gNB 410 corresponds to a first node in the present disclosure.

In one affiliated embodiment of the above subembodiment, at least the former two of the receiver 456, the receiving processor 452 and the controller/processor 490 are used for receiving K1 first-type reference signal(s).

In one affiliated embodiment of the above subembodiment, at least the former two of the receiver 456, the receiving processor 452 and the controller/processor 490 are used for receiving a first radio signal.

In one affiliated embodiment of the above subembodiment, at least the former two of the transmitter 456, the transmitting processor 455 and the controller/processor 490 are used for transmitting a first radio signal.

In one affiliated embodiment of the above subembodiment, at least the former two of the receiver 456, the receiving processor 452 and the controller/processor 490 are used for receiving a first signaling.

In one affiliated embodiment of the above subembodiment, at least the former two of the receiver 456, the receiving processor 452 and the controller/processor 490 are used for receiving a third signaling.

In one affiliated embodiment of the above subembodiment, at least the former two of the transmitter 456, the transmitting processor 455 and the controller/processor 490 are used for transmitting a third radio signal.

In one affiliated embodiment of the above subembodiment, at least the former two of the transmitter 416, the transmitting processor 415 and the controller/processor 440 are used for transmitting K1 first-type reference signal(s).

In one affiliated embodiment of the above subembodiment, at least the former two of the transmitter 416, the transmitting processor 415 and the controller/processor 440 are used for transmitting a first radio signal.

In one affiliated embodiment of the above subembodiment, at least the former two of the receiver 416, the receiving processor 412 and the controller/processor 440 are used for receiving a first radio signal.

In one affiliated embodiment of the above subembodiment, at least the former two of the transmitter 416, the transmitting processor 415 and the controller/processor 440 are used for transmitting a first signaling.

In one affiliated embodiment of the above subembodiment, at least the former two of the transmitter 416, the transmitting processor 415 and the controller/processor 440 are used for transmitting a third signaling.

In one affiliated embodiment of the above subembodiment, at least the former two of the receiver 416, the receiving processor 412 and the controller/processor 440 are used for receiving a third radio signal.

In one subembodiment, the UE 450 corresponds to a first node in the present disclosure, and the gNB 410 corresponds to a first base station in the present disclosure.

In one affiliated embodiment of the above subembodiment, at least the former two of the transmitter 456, the transmitting processor 455 and the controller/processor 490 are used for transmitting K1 first-type reference signal(s).

In one affiliated embodiment of the above subembodiment, at least the former two of the transmitter 456, the transmitting processor 455 and the controller/processor 490 are used for transmitting a second radio signal.

In one affiliated embodiment of the above subembodiment, at least the former two of the receiver 456, the receiving processor 452 and the controller/processor 490 are used for receiving a second radio signal.

In one affiliated embodiment of the above subembodiment, at least the former two of the receiver 456, the receiving processor 452 and the controller/processor 490 are used for receiving a second signaling.

In one affiliated embodiment of the above subembodiment, at least the former two of the receiver 456, the receiving processor 452 and the controller/processor 490 are used for receiving a fourth signaling.

In one affiliated embodiment of the above subembodiment, at least the former two of the transmitter 456, the transmitting processor 455 and the controller/processor 490 are used for transmitting a fourth radio signal.

In one affiliated embodiment of the above subembodiment, at least the former two of the receiver 456, the receiving processor 452 and the controller/processor 490 are used for receiving K2 second-type reference signal(s).

In one affiliated embodiment of the above subembodiment, at least the former two of the receiver 456, the receiving processor 452 and the controller/processor 490 are used for receiving first information.

In one affiliated embodiment of the above subembodiment, at least the former two of the receiver 456, the receiving processor 452 and the controller/processor 490 are used for receiving second information.

In one affiliated embodiment of the above subembodiment, at least the former two of the receiver 416, the receiving processor 412 and the controller/processor 440 are used for receiving K1 first-type reference signal(s).

In one affiliated embodiment of the above subembodiment, at least the former two of the receiver 416, the receiving processor 412 and the controller/processor 440 are used for receiving a second radio signal.

In one affiliated embodiment of the above subembodiment, at least the former two of the transmitter 416, the transmitting processor 415 and the controller/processor 440 are used for transmitting a second radio signal.

In one affiliated embodiment of the above subembodiment, at least the former two of the transmitter 416, the transmitting processor 415 and the controller/processor 440 are used for transmitting a second signaling.

In one affiliated embodiment of the above subembodiment, at least the former two of the transmitter 416, the transmitting processor 415 and the controller/processor 440 are used for transmitting a fourth signaling.

In one affiliated embodiment of the above subembodiment, at least the former two of the receiver 416, the receiving processor 412 and the controller/processor 440 are used for receiving a fourth radio signal.

In one affiliated embodiment of the above subembodiment, at least the former two of the transmitter 416, the transmitting processor 415 and the controller/processor 440 are used for transmitting K2 second-type reference signal(s).

In one affiliated embodiment of the above subembodiment, at least the former two of the transmitter 416, the transmitting processor 415 and the controller/processor 440 are used for transmitting first information.

In one affiliated embodiment of the above subembodiment, at least the former two of the transmitter 416, the transmitting processor 415 and the controller/processor 440 are used for transmitting second information.

Embodiment 5

Figure 5:
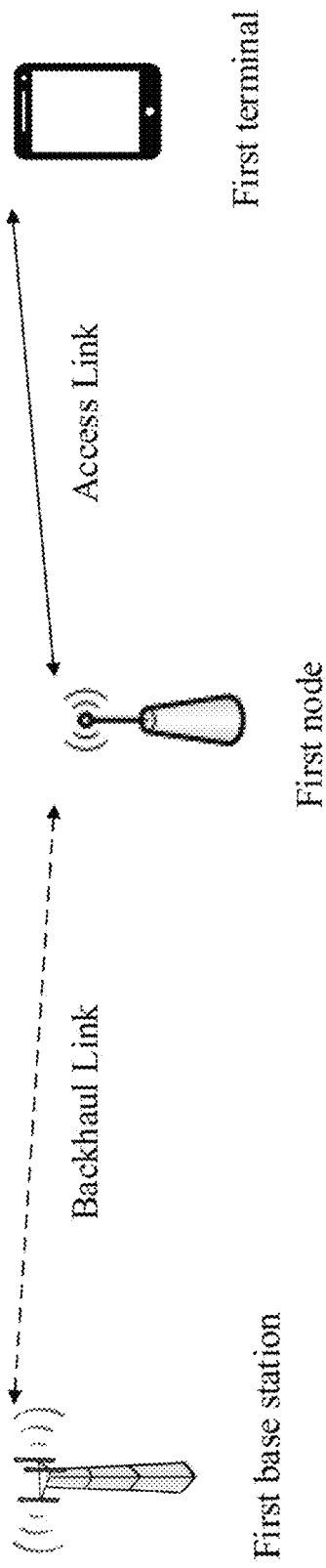
FIG. 5 is a schematic diagram of a first node, a first terminal and a first base station according to one embodiment of the present disclosure.

Embodiment 5 illustrates a schematic diagram of a first node, a first terminal and a first base station. In FIG. 5, a wireless link between a first base station and a first node is a backhaul link, and a wireless link between a first terminal and a first node is an access link; a first terminal acquires access to 4G/5G services via a first node.

In one subembodiment, the first node is a relay.

In one subembodiment, the first node is in wireless communication with the first base station as a mobile terminal.

In one subembodiment, the first node is in wireless communication with the first terminal as a base station.

In one subembodiment, the first node has an independent Physical Cell Identity (PCI).

In one subembodiment, the first node shares a PCI with the first base station.

In one subembodiment, the first node has an independent E-UTRAN Cell Global Identity (ECGI).

In one subembodiment, the first node shares an ECGI with the first base station.

In one subembodiment, the first node is a relay with limited radio frequency.

In one affiliated embodiment of the subembodiment, the limited radio frequency means that reception cannot be performed on two system frequency bands simultaneously.

In one affiliated embodiment of the subembodiment, the limited radio frequency means that transmission cannot be performed on two system frequency bands simultaneously.

In one affiliated embodiment of the subembodiment, the limited radio frequency means that the first node comprises only one set of radio frequency links.

In one affiliated embodiment of the subembodiment, the limited radio frequency means that the first node comprises only two sets of radio frequency links, and the two sets of radio frequency links correspond to separate frequency bands respectively.

Embodiment 6

Figure 6:
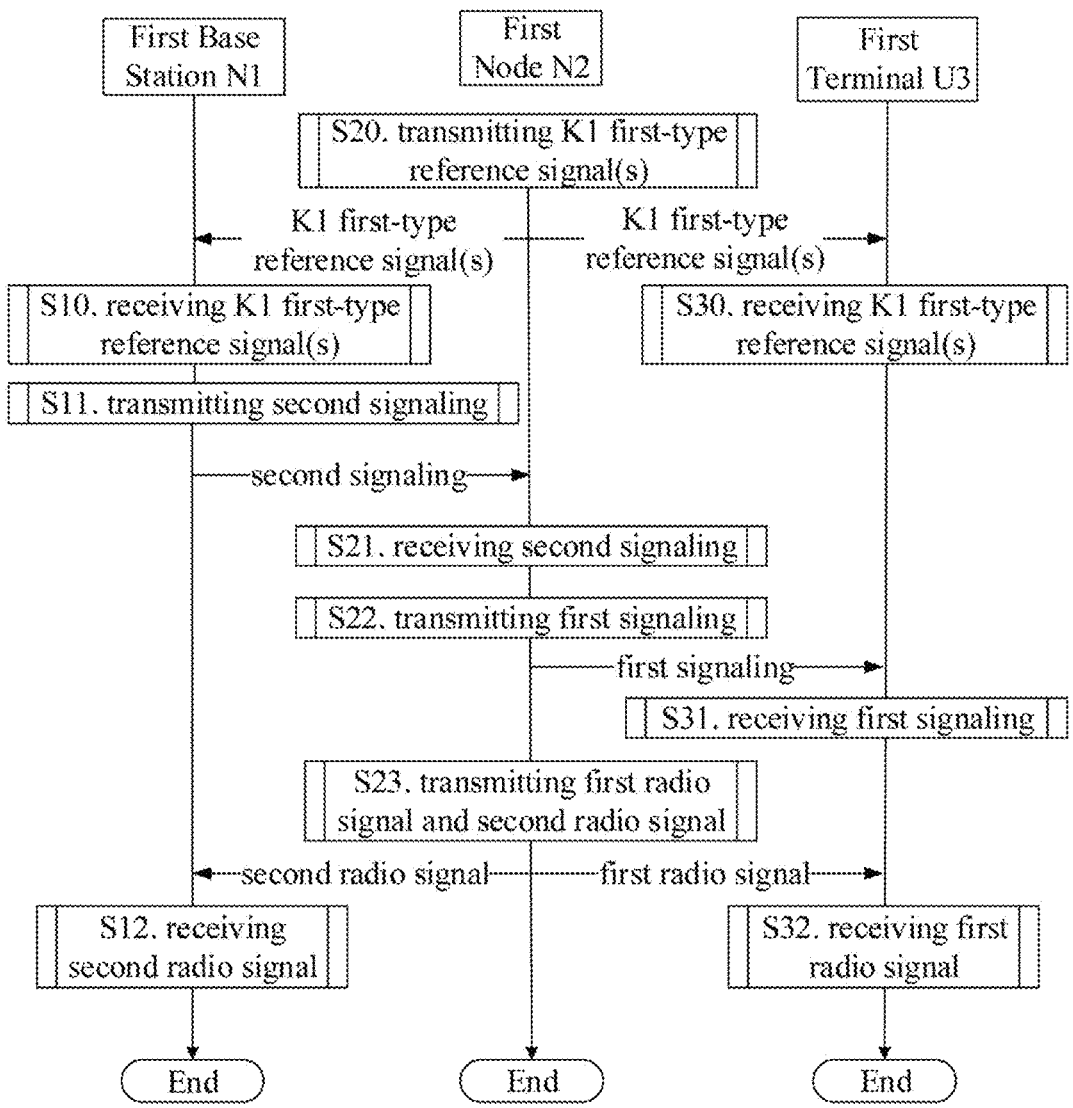
FIG. 6 is a flowchart of a first radio signal according to one embodiment of the present disclosure.

Embodiment 6 illustrates a flowchart of a first radio signal, as shown in FIG. 6. In FIG. 6, a first node N2 is a maintenance base station for a serving cell of a first terminal U3, and a first node N2 is in communication with a first base station N1 via a backhaul link. Subembodiments in Embodiment 6 can be applied to Embodiment 7 if no conflict is incurred.

The first base station N1 receives K1 first-type reference signal(s) in step S10; transmits a second signaling in step S11; and receives a second radio signal in step S12.

The first node N2 transmits K1 first-type reference signal(s) in step S20; receives a second signaling in step S21; transmits a first signaling in step S22; and transmits a first radio signal and a second radio signal in step S23.

The first terminal U3 receives K1 first-type reference signal(s) in step S30; receives a first signaling in step S31; and receives a first radio signal in step S32.

In Embodiment 5, the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) include a first base station N1 and a first terminal U3, the first base station N1 and the first terminal U3 are non-co-located; the K1 is a positive integer; the phrase that the first antenna port set and the second antenna port set are related to the target antenna port set respectively comprises: any antenna port of the first antenna port set is spatially related to at least one antenna port of the target antenna port set, and any antenna port of the second antenna port set is spatially related to at least one antenna port of the target antenna port set; the first signaling indicates the first antenna port set; the second signaling indicates the second antenna port set; the first signaling comprises a first configuration parameter group, the first configuration parameter group is related to the first radio signal; the second signaling comprises a second configuration parameter group, the second configuration group is related to the second radio signal.

In one subembodiment, the first radio signal and the second radio signal occupy the same time domain resources.

In one subembodiment, the first radio signal and the second radio signal are Frequency-division multiplexing (FDM).

In one subembodiment, the first radio signal and the second radio signal occupy different time domain resources.

In one subembodiment, the phrase that the first base station N1 and the first terminal U3 are non-co-located comprises at least one of the following:

the first base station N1 and the first terminal U3 are two separate pieces of communications equipment;

the first base station N1 and the first terminal U3 correspond to different Identifiers (IDs);

the first base station N1 and the first terminal U3 are located in difference places;

the first base station N1 and the first terminal U3 have no wired link in between.

In one subembodiment, an antenna port being spatially related to another antenna port comprises: large-scale characteristics of the another antenna port can be used for inferring large-scale characteristics of the antenna port.

In one subembodiment, an antenna port being spatially related to another antenna port comprises: the another antenna port and the antenna port are respectively formed by multiple antennas through antenna virtualization vector superposition, a correlation coefficient between an antenna virtualization vector used for generating the another antenna port and an antenna virtualization vector used for generating the antenna port is greater than a specific threshold. The specific threshold is greater than 0 and not greater than 1.

In one subembodiment, an antenna port being spatially related to another antenna port comprises: a receiving beam for the antenna port can be used for reception of the another antenna port.

In one subembodiment, the large-scale characteristics in the present disclosure include one or more of delay spread, Doppler spread, Doppler shift, path loss, average gain and average delay.

In one subembodiment, the first base station N1 receives the second radio signal in a first time unit, the first terminal U3 receives the first radio signal in the first time unit.

In one subembodiment, the first terminal U3 can infer a Spatial Rx Parameter of the first radio signal transmitted from the first antenna port set through Spatial Rx Parameter(s) of a radio signal transmitted from the target antenna port set.

In one subembodiment, the first base station N1 can infer a Spatial Rx Parameter of the first radio signal transmitted from the first antenna port set through Spatial Rx Parameter(s) of a radio signal transmitted from the target antenna port set.

In one subembodiment, the Spatial Rx Parameter in the present disclosure comprises one of an analog beamforming vector, a reception beamforming vector or an analog beamforming matrix.

In one subembodiment, the first node N2 employs the first antenna port set for transmitting the first radio signal, the first node N2 employs the second antenna port set for transmitting the second radio signal.

In one subembodiment, the first antenna port set is an antenna port set occupied by CSI-RS.

In one subembodiment, the target antenna port set is an antenna port set occupied by CSI-RS.

In one subembodiment, the first antenna port set and the target antenna port set are a same antenna port set.

In one subembodiment, the first antenna port set and the target antenna port set comprise same antenna port(s).

In one subembodiment, the second antenna port set and the target antenna port set are a same antenna port set, In one subembodiment, the second antenna port set and the target antenna port set comprise same antenna port(s).

In one subembodiment, the first node N2 transmits the first radio signal and the second radio signal employing a same transmission beamforming vector.

In one subembodiment, the first signaling is Downlink Control Information (DCI).

In one subembodiment, the second signaling is DCI.

In one subembodiment, the first signaling is Downlink Grant.

In one subembodiment, the second signaling is Uplink Grant.

In one subembodiment, the first signaling comprises given first information, the given first information is used for indicating the first antenna port set.

In one affiliated embodiment of the subembodiment, the given first information refers to Transmission Configuration Indication (TCI) in TS 38.213.

In one affiliated embodiment of the subembodiment, the given first information refers to TCI State in TS 38.214.

In one subembodiment, the second information comprises given second information, the given second information is used for indicating the second antenna port set.

In one affiliated embodiment of the subembodiment, the given second information refers to SRS Resource Indicator in TS 38.213.

In one subembodiment, the phrase that the first configuration parameter group is related to the first radio signal means: the first configuration parameter group comprises at least one of time domain resources occupied by the first radio signal, frequency domain resources occupied by the first radio signal, a Modulation and Coding Scheme (MCS), a Redundancy Version (RV), a New Data Indicator (NDI) or a Hybrid Automatic Repeat Request (HARQ) process number.

In one subembodiment, the phrase that the second configuration parameter group is related to the second radio signal means: the second configuration parameter group comprises at least one of time domain resources occupied by the second radio signal, frequency domain resources occupied by the second radio signal, an MCS, an RV, an NDI or a HARQ process number.

In one subembodiment, the first radio signal is transmitted on a Physical Downlink Shared Channel (PDSCH).

In one subembodiment, the second radio signal is transmitted on a Physical Uplink Shared Channel (PUSCH).

Embodiment 7

Figure 7:
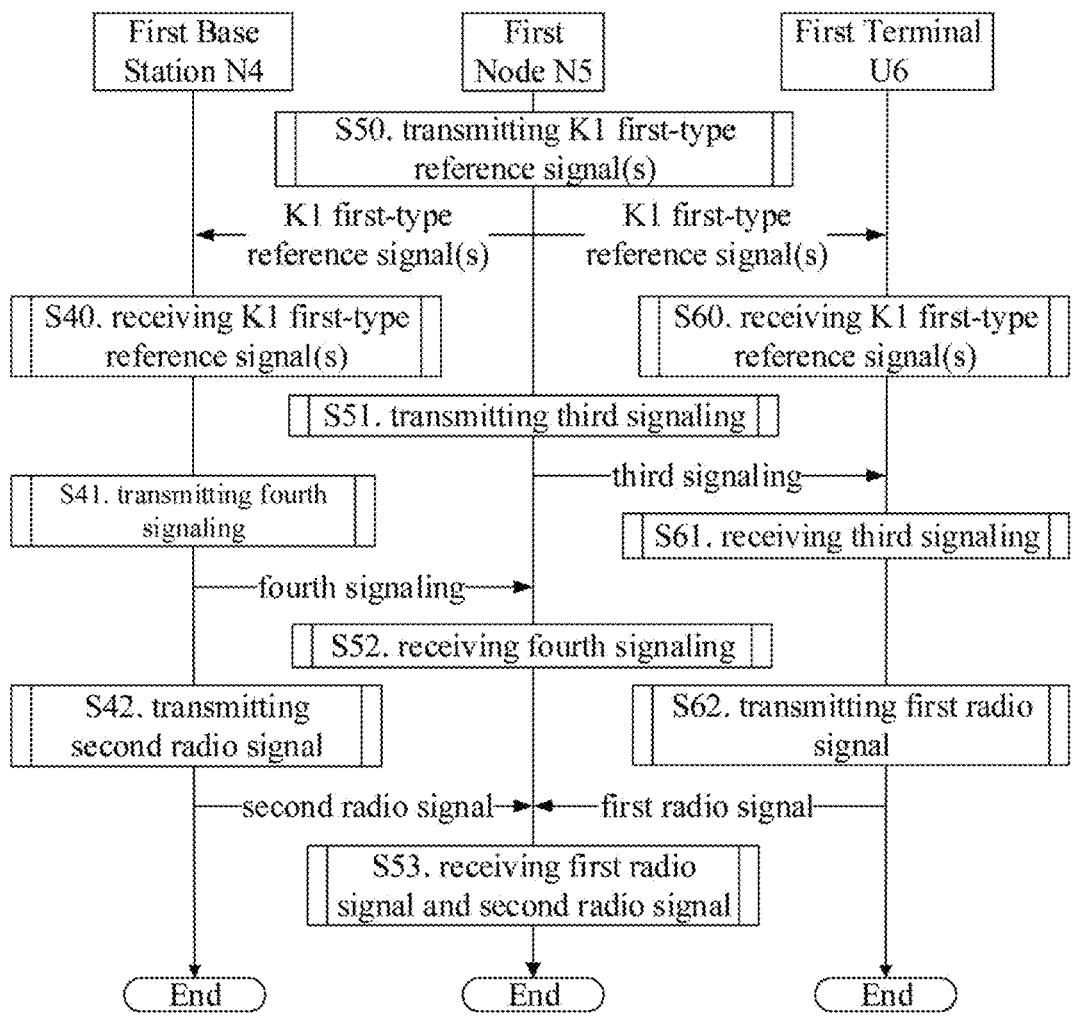
FIG. 7 is a flowchart of a first radio signal according to another embodiment of the present disclosure.

Embodiment 7 illustrates an example of a flowchart of a first radio signal, as shown in FIG. 7. In FIG. 7, a first node N5 is a maintenance base station for a serving cell of a first terminal U6, and a first node N5 is in communication with a first base station N4 via a backhaul link.

The first base station N4 receives K1 first-type reference signal(s) in step S40; transmits a fourth signaling in step S41; and transmits a second radio signal in step S42.

The first node N5 transmits K1 first-type reference signal(s) in step S50; transmits a third signaling in step S51; receives a fourth signaling in step S52; and receives a first radio signal and a second radio signal in step S53.

The first terminal U6 receives K1 first-type reference signal(s) in step S60; receives a third signaling in step S61; and transmits a first radio signal in step S62.

In Embodiment 7, the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) include a first base station N4 and a first terminal U6, the first base station N4 and the first terminal U6 are non-co-located; the first radio signal and the second radio signal are respectively transmitted by the first terminal U6 and the first base station N4; a first spatial Rx parameter and a second spatial Rx parameter are respectively used for receiving the first radio signal and the second radio signal; the phrase that the first antenna port set and the second antenna port set are related to the target antenna port set respectively comprises: the first spatial Rx parameter and the second spatial Rx parameter are associated to the target antenna port set respectively; the third signaling indicates the first antenna port set, the fourth signaling indicates the second antenna port set; the third signaling comprises a third configuration parameter group, the third configuration parameter group is related to the first radio signal; the fourth signaling comprises a fourth configuration parameter group, the fourth configuration parameter group is related to the second radio signal.

In one subembodiment, the phrase that the first spatial Rx parameter and the second spatial Rx parameter are associated to the target antenna port set respectively comprises: the first node N5 can determine the first spatial Rx parameter group through a radio signal transmitted from the target antenna port set.

In one affiliated embodiment of the subembodiment, the first spatial Rx parameter comprises one of an analog beamforming vector, a reception beamforming vector or an analog beamforming matrix.

In one subembodiment, the phrase that the first spatial Rx parameter and the second spatial Rx parameter are associated to the target antenna port set respectively comprises: the first node N5 can determine the second spatial Rx parameter group based on a radio signal transmitted from the target antenna port set.

In one affiliated embodiment of the subembodiment, the second spatial Rx parameter comprises one of an analog beamforming vector, a reception beamforming vector or an analog beamforming matrix.

In one subembodiment, the phrase that the first spatial Rx parameter and the second spatial Rx parameter are associated to the target antenna port set respectively comprises: the first node N5 transmits a radio signal on the target antenna port set employing a given transmission beamforming vector, the given transmission beamforming vector is used for generating a given reception beamforming vector, the first spatial Rx parameter and the second spatial Rx parameter both comprise the given reception beamforming vector.

In one subembodiment, the phrase that the first spatial Rx parameter and the second spatial Rx parameter are associated to the target antenna port set respectively comprises: the first node N5 transmits a radio signal on the target antenna port set employing a given transmission analog beamforming vector, the given transmission analog beamforming vector is used for generating a given reception analog beamforming vector, the first spatial Rx parameter and the second spatial Rx parameter both comprise the given reception analog beamforming vector.

In one subembodiment, the phrase that the first spatial Rx parameter and the second spatial Rx parameter are associated to the target antenna port set respectively comprises: the first node N5 transmits a radio signal on the target antenna port set employing a given transmission analog beamforming matrix, the given transmission analog beamforming matrix is used for generating a given reception analog beamforming matrix, the first spatial Rx parameter and the second spatial Rx parameter both comprise the given reception analog beamforming matrix.

In one subembodiment, the first terminal U6 can determine the first antenna port set based on a spatial Rx parameter of a radio signal transmitted from the target antenna port set, the first terminal U6 transmits the first radio signal with the first antenna port set.

In one subembodiment, the first base station N4 can determine the second antenna port set based on a spatial Rx parameter of a radio signal transmitted from the target antenna port set, the first base station N4 transmits the second radio signal with the second antenna port set.

In one subembodiment, there is at least one multicarrier symbol occupied by the first radio signal and the second radio signal simultaneously.

In one subembodiment, the third signaling is DCI.

In one subembodiment, the fourth signaling is DCI.

In one subembodiment, the third signaling is Uplink Grant.

In one subembodiment, the fourth signaling is Downlink Grant.

In one subembodiment, the third signaling comprises given third information, the given third information is used for indicating the first antenna port set.

In one affiliated embodiment of the subembodiment, the given third information refers to SRS Resource Indicator in TS 38.213.

In one subembodiment, the fourth signaling comprises given fourth information, the given fourth information is used for indicating the second antenna port set.

In one affiliated embodiment of the subembodiment, the given fourth information refers to Transmission Configuration Indication in TS 38.213.

In one affiliated embodiment of the subembodiment, the given fourth information refers to TCI State in TS 38.214.

In one subembodiment, the phrase that the third configuration parameter group is related to the first radio signal means: the third configuration parameter group comprises at least one of time domain resources occupied by the first radio signal, frequency domain resources occupied by the first radio signal, an MCS, an RV, an NDI, or a HARQ process number.

In one subembodiment, the phrase that the fourth configuration parameter group is related to the first radio signal means: the fourth configuration parameter group comprises at least one of time domain resources occupied by the second radio signal, frequency domain resources occupied by the second radio signal, an MCS, an RV, an NDI, or a HARQ process number.

In one subembodiment, a transmitter of a fourth signaling is the first base station.

In one subembodiment, the first radio signal is transmitted on a PUSCH.

In one subembodiment, the second radio signal is transmitted on a PDSCH.

Embodiment 8

Figure 8:
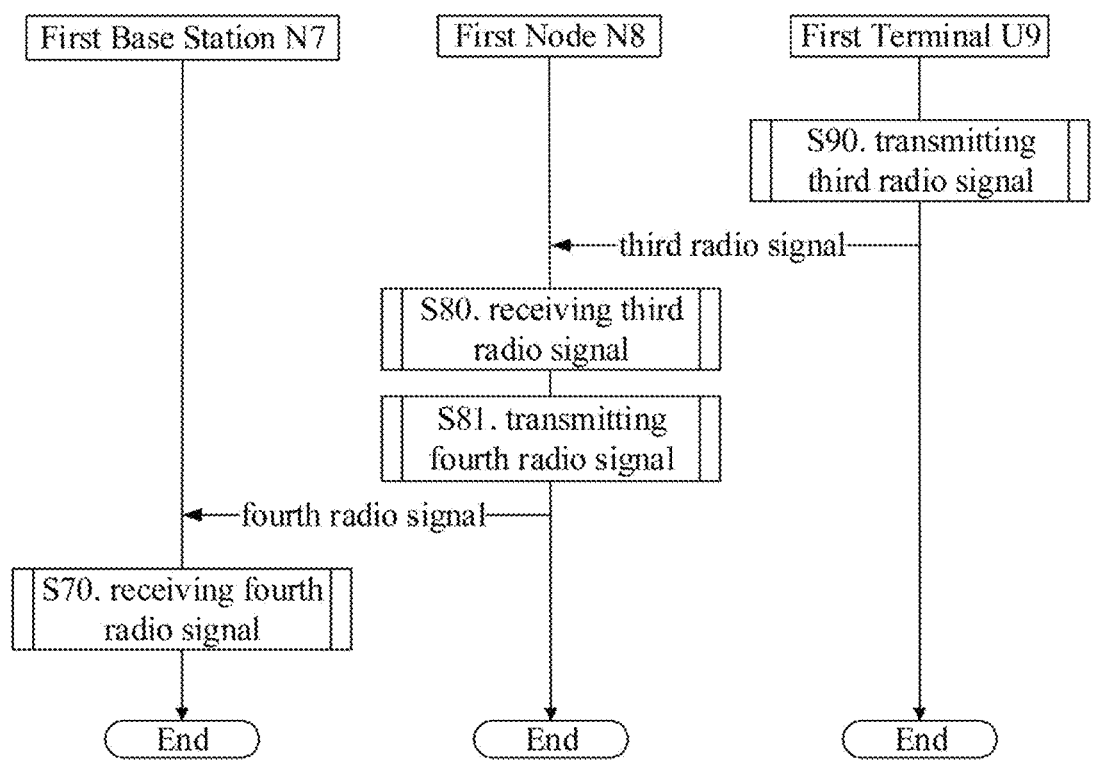
FIG. 8 is a flowchart of a third radio signal and a fourth radio signal according to one embodiment of the present disclosure.

Embodiment 8 illustrates a flowchart of a third radio signal and a fourth radio signal, as shown in FIG. 8. In FIG. 8, a first node N8 is a maintenance base station for a serving cell of a first terminal U9, and a first node N8 is in communication with a first base station N7 via a backhaul link.

The first base station N7 receives a fourth radio signal in step S70.

The first node N8 receives a third radio signal in step S80; and transmits a fourth radio signal in step S81.

The first terminal U9 transmits a third radio signal in step S90.

In Embodiment 8, the third radio signal is used for generating at least one of the target antenna port set or the first antenna port set in the present disclosure; the fourth radio signal is used for indicating a candidate antenna port set, the candidate antenna port set is a first-type antenna port set of the K1 first-type antenna port set(s), the candidate antenna port set is related to the first antenna port set.

In one subembodiment, step S70 can be placed between step S10 and step S11 of Embodiment 6.

In one subembodiment, steps S80 and S81 can be placed between step S20 and step S21 of Embodiment 6.

In one subembodiment, step S90 can be placed between step S30 and step S31 of Embodiment 6.

In one subembodiment, step S70 can be placed between step S40 and step S41 of Embodiment 7.

In one subembodiment, steps S80 and S81 can be placed between step S50 and step S51 of Embodiment 7.

In one subembodiment, step S90 can be placed between step S60 and step S61 of Embodiment 7.

In one subembodiment, the third radio signal comprises a Channel State Information Reference Signal Resource Indication (CRI).

In one subembodiment, the phrase that the third radio signal is used for generating at least one of the target antenna port set or the first antenna port set means: the third radio signal comprises a given CRI, the given CRI is used for indicating the target antenna port set.

In one subembodiment, the phrase that the third radio signal is used for generating at least one of the target antenna port set or the first antenna port set means: the third radio signal comprises a given CRI, the given CRI is used for indicating the first antenna port set.

In one subembodiment, the phrase that the third radio signal is used for generating at least one of the target antenna port set or the first antenna port set means: the third radio signal comprises a given CRI, the given CRI is used for indicating a given antenna port set, the given antenna port set and the target antenna port set are Quasi Co-located (QCL).

In one affiliated embodiment of the subembodiment, the phrase that the given antenna port set and the target antenna port set are QCL means: the first terminal can infer a spatial Rx parameter of a radio signal transmitted from the target antenna port set based on a spatial Rx parameter of a radio signal transmitted from the given antenna port set.

In one subembodiment, the phrase that the third radio signal is used for generating at least one of the target antenna port set or the first antenna port set means: the third radio signal comprises a given CRI, the given CRI is used for indicating a given antenna port set, the given antenna port set and the first antenna port set are Quasi Co-located (QCL).

In one affiliated embodiment of the subembodiment, the phrase that the given antenna port set and the first antenna port set are QCL means: the first terminal can infer a spatial Rx parameter of a radio signal transmitted from the first antenna port set based on a spatial Rx parameter of a radio signal transmitted from the given antenna port set.

In one affiliated embodiment of the subembodiment, the phrase that the given antenna port set and the first antenna port set are QCL means: the first terminal can infer a spatial transmission parameter of a radio signal transmitted from the first antenna port set based on a spatial Rx parameter of a radio signal transmitted from the given antenna port set.

In one affiliated embodiment of the subembodiment, the phrase that the given antenna port set and the first antenna port set are QCL means: the first terminal can infer the first antenna port set based on a spatial Rx parameter of a radio signal transmitted from the given antenna port set.

In one subembodiment, the spatial transmission parameter comprises at least one of an analog beamforming vector, a transmission beamforming vector or an analog beamforming matrix.

In one subembodiment, the candidate antenna port set is a CRI, or the candidate antenna port set is an SRI.

In one subembodiment, the phrase that the candidate antenna port set is related to the first antenna port set means: the candidate antenna port set and the first antenna port set are a same antenna port set.

In one subembodiment, the phrase that the candidate antenna port set is related to the first antenna port set means: the first node receives a radio signal transmitted from the candidate antenna port set and a radio signal transmitted from the first antenna port set simultaneously by employing a same spatial Rx parameter.

In one subembodiment, the phrase that the candidate antenna port set is related to the first antenna port set means: the first node transmits a radio signal on the candidate antenna port set and transmits a radio signal on the first antenna port set simultaneously by employing a same spatial transmission parameter.

Embodiment 9

Figure 9:
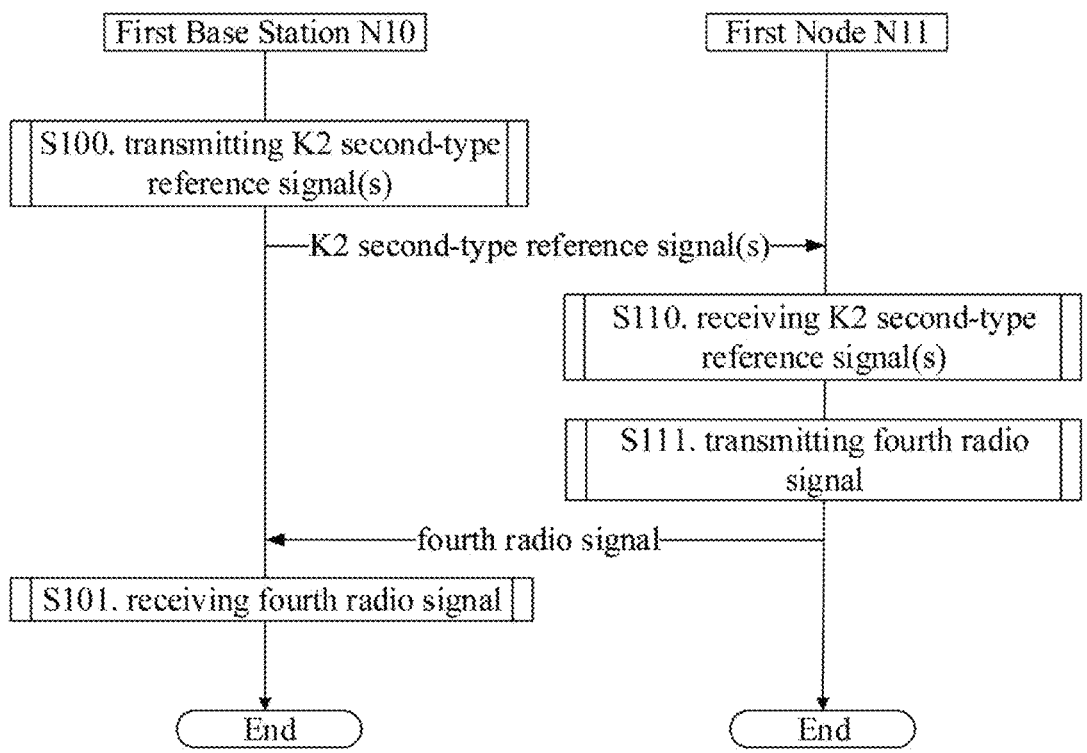
FIG. 9 is a flowchart of K2 second-type reference signal(s) according to one embodiment of the present disclosure.

Embodiment 9 illustrates a flowchart of K2 second-type reference signal(s), as shown in FIG. 9. In FIG. 9, a first node N11 is in communication with a first base station N10 via a backhaul link.

The first base station N10 transmits K2 second-type reference signal(s) in step S100; and receives a fourth radio signal in step S101.

The first node N11 receives K2 second-type reference signal(s) in step S110; and transmits a fourth radio signal in step S111.

In Embodiment 9, the K2 second-type reference signal(s) is(are) transmitted by the K2 second-type antenna port set(s) respectively; the fourth radio signal is used for indicating a third antenna port set, the third antenna port set is a second-type antenna port set of the K2 second-type antenna port set(s), the target antenna port set is related to the third antenna port set.

In one subembodiment, steps S100 and S101 can be placed between step S10 and step S11 of Embodiment 6.

In one subembodiment, steps S110 and S111 can be placed between step S20 and step S21 of Embodiment 6.

In one subembodiment, steps S100 and S101 can be placed between step S40 and step S41 of Embodiment 7.

In one subembodiment, steps S110 and S111 can be placed between step S50 and step S51 of Embodiment 7.

In one subembodiment, the phrase that the target antenna port set is related to the third antenna port set means: the first node can infer a spatial transmission parameter of a radio signal transmitted from the target antenna port set based on a spatial Rx parameter of a radio signal transmitted from the third antenna port set.

In one subembodiment, K2 CSI-RS(s) is(are) transmitted from the K2 second-type antenna port set(s) respectively.

Embodiment 10

Figure 10:
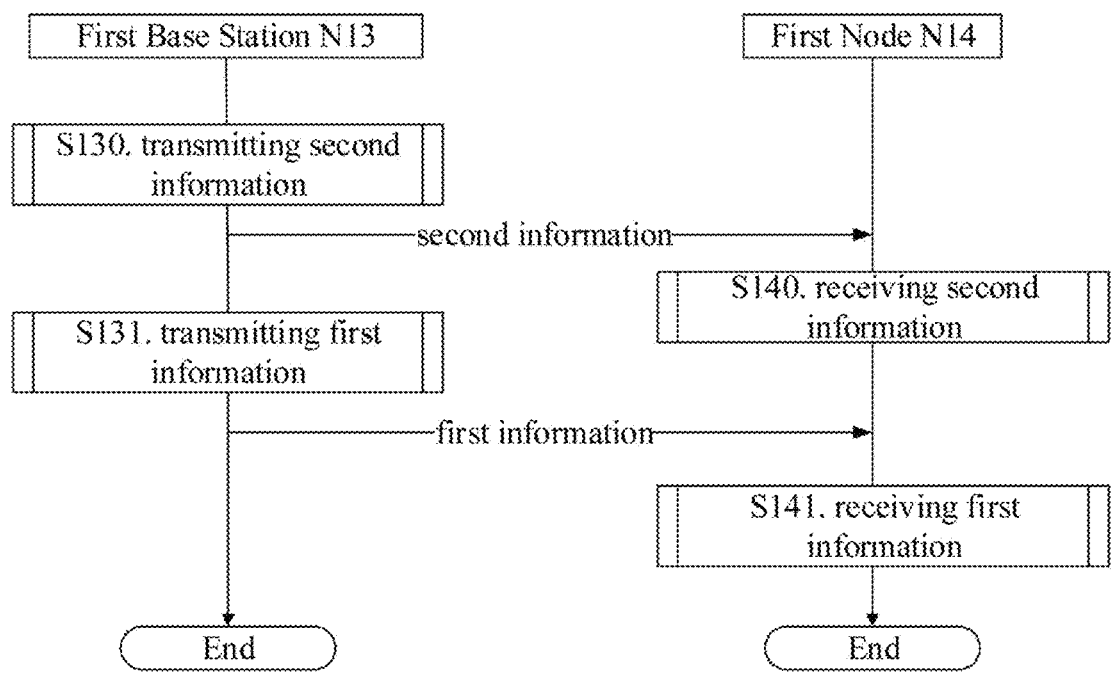
FIG. 10 is a flowchart of first information and second information according to one embodiment of the present disclosure.

Embodiment 10 illustrates a flowchart of first information and second information. In FIG. 10, a first node N14 is in communication with a first base station N13 via a backhaul link.

The first base station N13 transmits second information is step S130; and transmits first information in step S131.

The first node N14 receives second information in step S140; and receives first information in step S141.

In Embodiment 10, the first information is used for indicating K1 first-type time-frequency resource set(s), the K1 first-type time-frequency resource set(s) is(are) occupied by the K1 first-type reference signal(s) respectively; the first information is transmitted via an air interface; the second information is used for determining a target time unit set, the target time unit set comprises M1 target time unit(s), a first time unit is a target time unit of the M1 target time unit(s); time-domain resources occupied by the first radio signal and the second radio signal belong to the first time unit; the second information is transmitted via an air interface; the M1 is a positive integer.

In one subembodiment, steps S130 and S131 can be placed before step S10 of Embodiment 6.

In one subembodiment, steps S140 and S141 can be placed before step S20 of Embodiment 6.

In one subembodiment, steps S130 and S131 can be placed before step S40 of Embodiment 7.

In one subembodiment, steps S140 and S141 can be placed before step S50 of Embodiment 7.

In one subembodiment, the phrase that the first information is transmitted via an air interface means: the first information is transmitted via a radio signal between a first base station N13 and a first node N14.

In one subembodiment, the phrase that the second information is transmitted via an air interface means: the second information is transmitted via a radio signal between a first base station N13 and a first node N14.

In one subembodiment, the phrase that the first information is transmitted via an air interface means: the first information is transmitted via a wireless link between a UE 201 and an NR node B203 of Embodiment 2.

In one subembodiment, the phrase that the second information is transmitted via an air interface means: the second information is transmitted via a wireless link between a UE 201 and an NR node B203 of Embodiment 2.

In one subembodiment, the first information comprises a UE-specific Radio Resource Control (RRC) signaling.

In one subembodiment, the first information comprises a relay-specific RRC signaling.

In one subembodiment, the first information comprises an RRC signaling specific to a terminal group.

In one subembodiment, the first information comprises an RRC signaling specific to a relay group.

In one subembodiment, the second information comprises a UE-specific RRC signaling.

In one subembodiment, the second information comprises a relay-specific RRC signaling.

In one subembodiment, the second information comprises an RRC signaling specific to a terminal group.

In one subembodiment, the second information comprises an RRC signaling specific to a relay group.

In one subembodiment, any one target time unit of the M1 target time unit(s) is a slot.

In one subembodiment, any one target time unit of the M1 target time unit(s) is a subframe.

Embodiment 11

Figure 11:
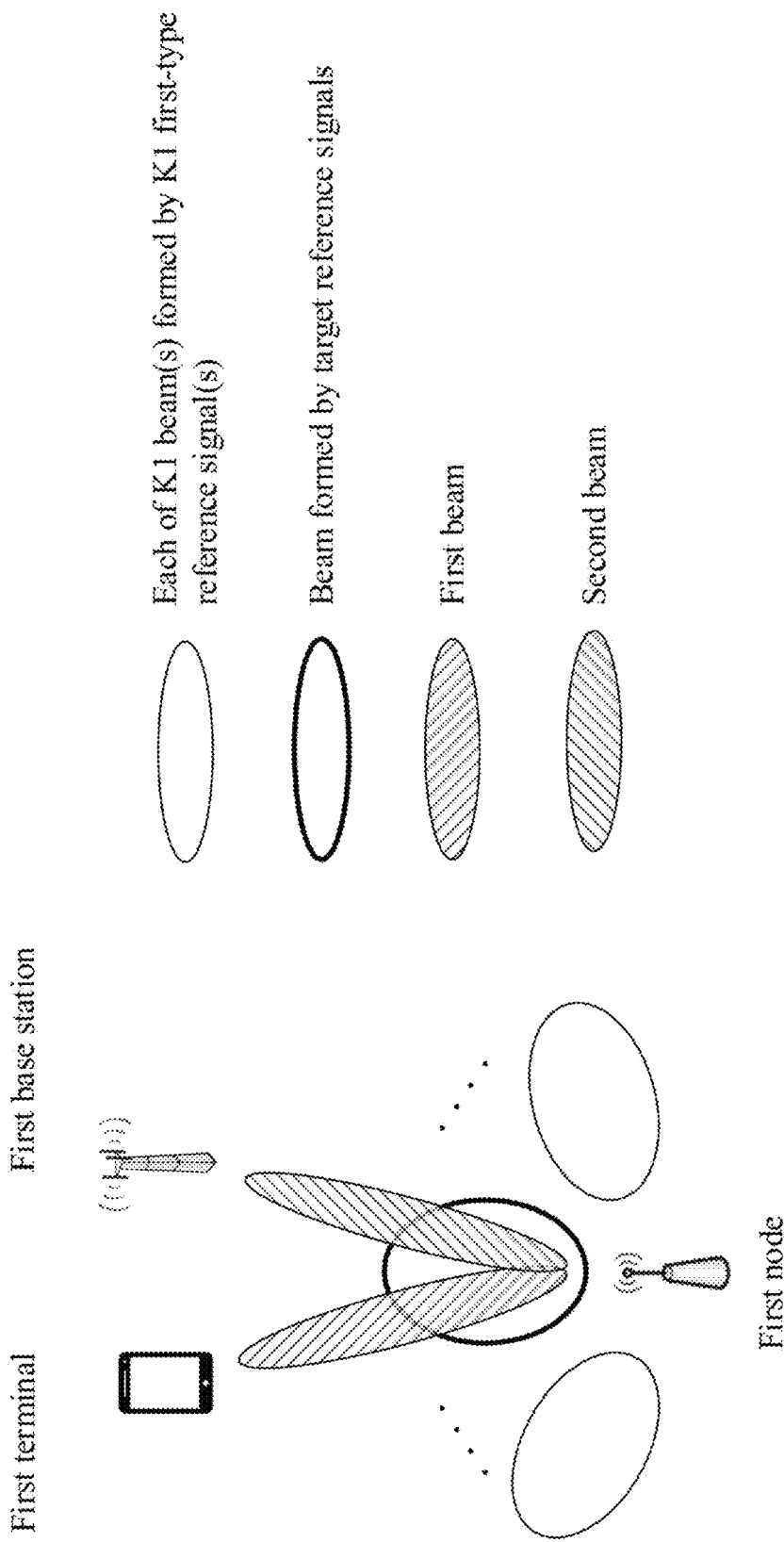
FIG. 11 is a schematic diagram illustrating a relationship between a target antenna port set, a first beam and a second beam according to one embodiment of the present disclosure.

Embodiment 11 illustrates a schematic diagram illustrating a relationship between a target antenna port set, a first beam and a second beam, as shown in FIG. 11. In FIG. 11, a target antenna port set is a first-type antenna port set of the K1 first-type antenna port set(s), the target antenna port set is used for transmitting a target reference signal.

In one subembodiment, the first node of the present disclosure employs the first antenna port set in the present disclosure for transmitting a first radio signal, a spatial transmission parameter formed by the first antenna port set corresponds to the first beam in FIG. 11; the first node of the present disclosure employs the second antenna port set for transmitting a second radio signal, a spatial transmission parameter formed by the second antenna port set corresponds to the second beam in FIG. 11.

In one affiliated embodiment of the subembodiment, the first terminal can infer a spatial Rx parameter of the first radio signal transmitted from the first antenna port set based on a spatial Rx parameter of a radio signal transmitted from the target antenna port set.

In one affiliated embodiment of the subembodiment, the first base station can infer a spatial Rx parameter of the second radio signal transmitted from the second antenna port set based on a spatial Rx parameter of a radio signal transmitted from the target antenna port set.

In one affiliated embodiment of the subembodiment, coverage of a spatial transmission parameter formed by the target antenna port set comprises coverage of a spatial transmission parameter formed by the first antenna port set; the spatial transmission parameter comprises one of a transmission analog beamforming vector, transmission beamforming vector or a transmission analog beamforming matrix.

In one affiliated embodiment of the subembodiment, coverage of a spatial transmission parameter formed by the target antenna port set comprises coverage of a spatial transmission parameter formed by the second antenna port set; the spatial transmission parameter comprises one of a transmission analog beamforming vector, transmission beamforming vector or a transmission analog beamforming matrix.

In one subembodiment, the first terminal of the present disclosure employs the first antenna port set in the present disclosure for transmitting a first radio signal, a spatial transmission parameter formed by the first antenna port set corresponds to the first beam in FIG. 11; the first base station of the present disclosure employs the second antenna port set in the present disclosure for transmitting a second radio signal, a spatial transmission parameter formed by the second antenna port set corresponds to the second beam in FIG. 11.

In one affiliated embodiment of the subembodiment, the first terminal can infer a spatial transmission parameter of the first radio signal transmitted from the first antenna port set based on a spatial Rx parameter of a radio signal transmitted from the target antenna port set.

In one affiliated embodiment of the subembodiment, the first base station can infer a spatial transmission parameter of the second radio signal transmitted from the second antenna port set based on a spatial Rx parameter of a radio signal transmitted from the target antenna port set.

In one affiliated embodiment of the subembodiment, coverage of a spatial transmission parameter formed by the target antenna port set comprises coverage of a spatial transmission parameter formed by the first antenna port set; the spatial transmission parameter comprises one of a transmission analog beamforming vector, transmission beamforming vector or a transmission analog beamforming matrix.

In one affiliated embodiment of the subembodiment, coverage of a spatial transmission parameter formed by the target antenna port set comprises coverage of a spatial transmission parameter formed by the second antenna port set; the spatial transmission parameter comprises one of a transmission analog beamforming vector, transmission beamforming vector or a transmission analog beamforming matrix.

In one affiliated embodiment of the subembodiment, the first node employs the first spatial Rx parameter and the second spatial Rx parameter for receiving the first radio signal and the second radio signal respectively; the first node employs a given transmission beamforming vector for transmitting a radio signal on the target antenna port set, the given transmission beamforming vector is used for generating a given reception beamforming vector, the first spatial Rx parameter and the second spatial Rx parameter both comprise the given reception beamforming vector.

In one affiliated embodiment of the subembodiment, the first node employs the first spatial Rx parameter and the second spatial Rx parameter for receiving the first radio signal and the second radio signal respectively; the first node employs a given transmission analog beamforming vector for transmitting a radio signal on the target antenna port set, the given transmission analog beamforming vector is used for generating a given reception analog beamforming vector, the first spatial Rx parameter and the second spatial Rx parameter both comprise the given reception analog beamforming vector.

In one affiliated embodiment of the subembodiment, the first node employs the first spatial Rx parameter and the second spatial Rx parameter for receiving the first radio signal and the second radio signal respectively; the first node employs a given transmission beamforming matrix for transmitting a radio signal on the target antenna port set, the given transmission beamforming matrix is used for generating a given reception beamforming matrix, the first spatial Rx parameter and the second spatial Rx parameter both comprise the given reception beamforming matrix.

Embodiment 12

Figure 12:
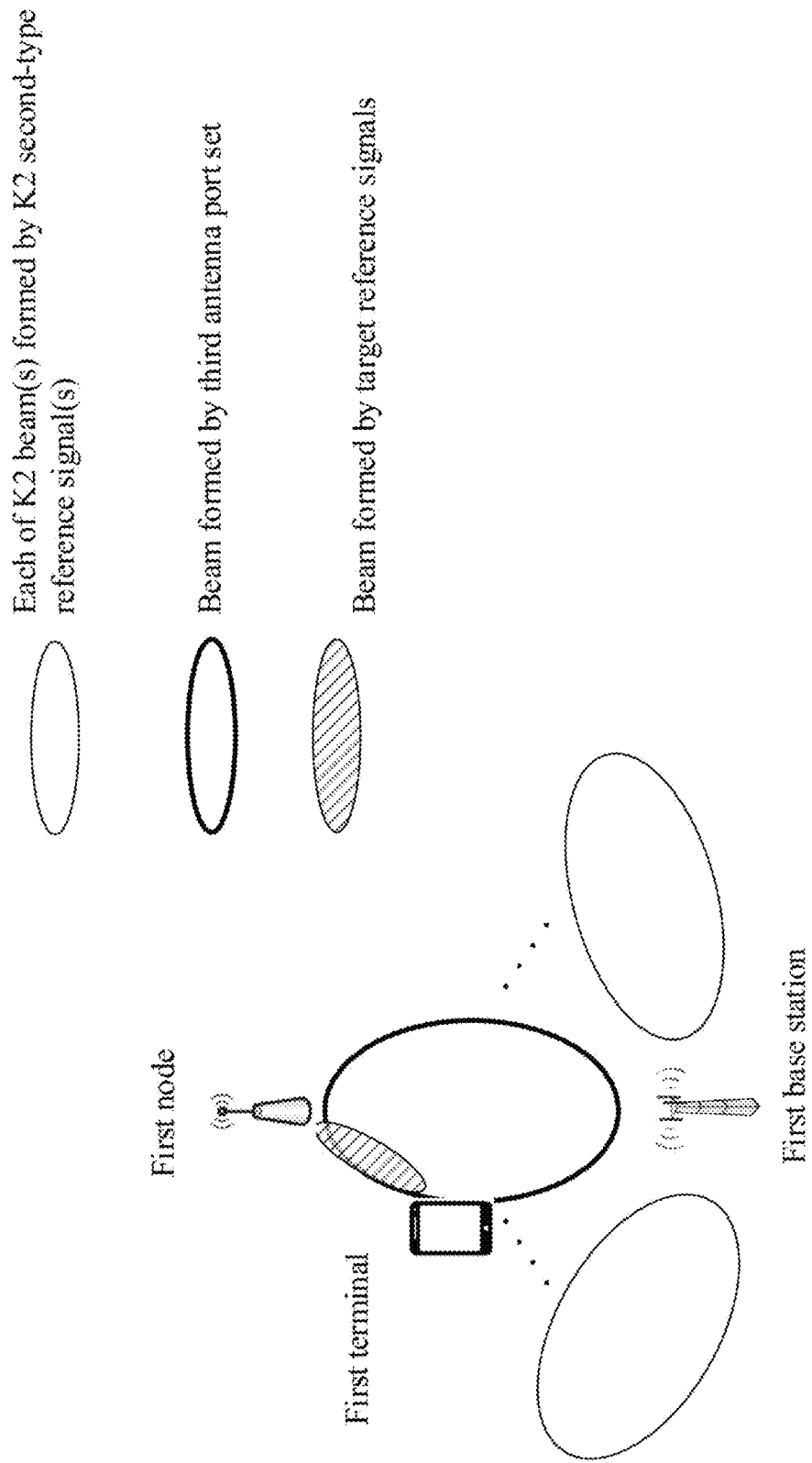
FIG. 12 is a schematic diagram of K2 second-type antenna port set(s) according to one embodiment of the present disclosure.

Embodiment 12 illustrates a schematic diagram of K2 second-type antenna port set(s), as shown in FIG. 12. In FIG. 12, a first base station transmits K2 second-type reference signal(s), a first node receives K2 second-type reference signal(s); the K2 second-type reference signal(s) is(are) transmitted by K2 second-type antenna port set(s) respectively, a third antenna port set is a second-type antenna port set of K2 second-type antenna port set(s), the first node determines the third antenna port set out of the K2 second-type antenna port set(s), the target antenna port set is related to the third antenna port set in the present disclosure.

In one subembodiment, the first node can infer a spatial transmission parameter of a radio signal transmitted from the target antenna port set based on a spatial Rx parameter of a radio signal transmitted from the third antenna port set.

In one subembodiment, coverage of a spatial transmission parameter formed by the target antenna port set belongs to coverage of a spatial transmission parameter formed by the third antenna port set; the spatial transmission parameter comprises one of a transmission analog beamforming vector, a transmission beamforming vector or a transmission analog beamforming matrix.

Embodiment 13

Figure 13:
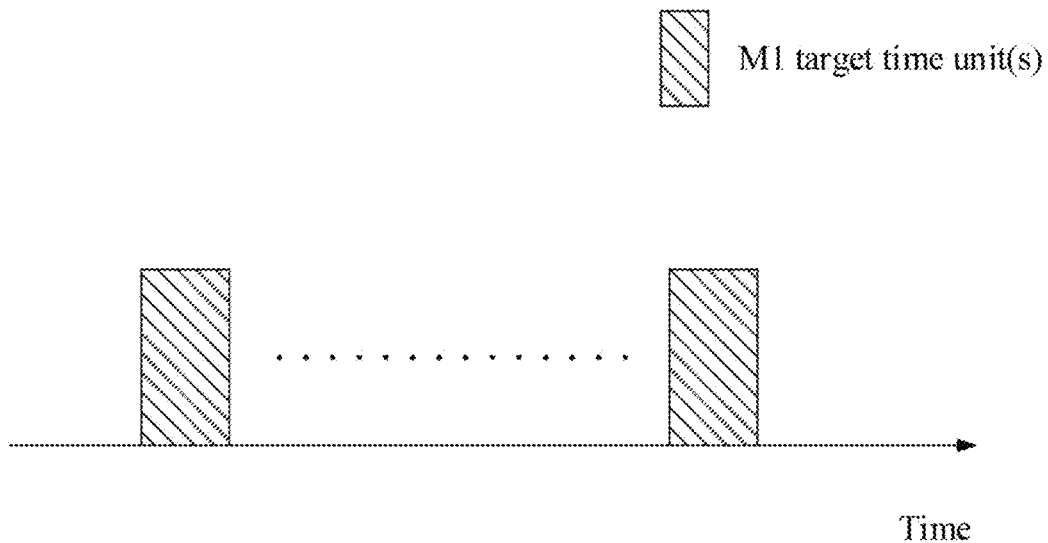
FIG. 13 is a schematic diagram of a target time unit set according to one embodiment of the present disclosure.

Embodiment 13 illustrates a schematic diagram of a target time unit set, as shown in FIG. 13. In FIG. 13, the target time unit set comprises M1 target time unit(s).

In one subembodiment, any one target time unit of the M1 target time unit(s) is a subframe.

In one subembodiment, any one target time unit of the M1 target time unit(s) is a slot.

In one subembodiment, any one target time unit of the M1 target time unit(s) is a mini-slot.

In one subembodiment, the M1 target time units are discrete in time domain.

In one subembodiment, the M1 target time units are consecutive in time domain.

Embodiment 14

Figure 14:
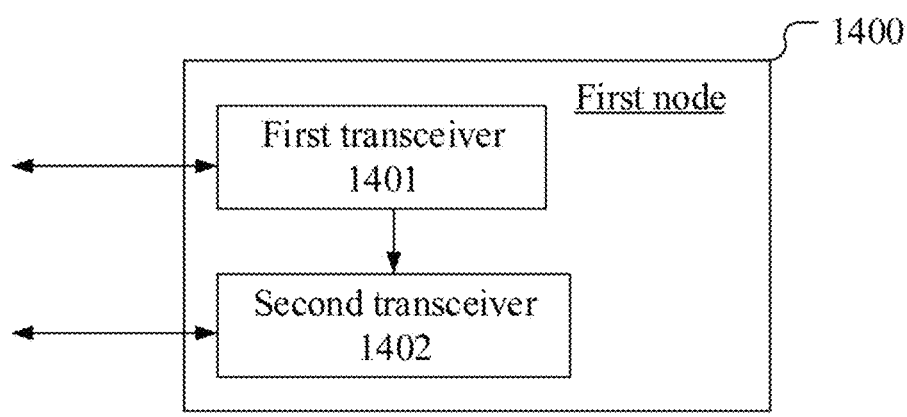
FIG. 14 is a structure block diagram illustrating a processing device in a first node according to one embodiment of the present disclosure.

Embodiment 14 illustrates a structure block diagram illustrating a processing device in a first node, as shown in FIG. 14. In FIG. 14, a first node processing device 1400 includes a first transceiver 1401 and a second transceiver 1402.

A first transceiver 1401, transmitting K1 first-type reference signal(s); and a second transceiver 1402, operating a first radio signal and a second radio signal;

in Embodiment 14, the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) include a first base station and a first terminal, the first base station and the first terminal are non-co-located; the operating action is transmitting, or, the operating action is receiving; the K1 is a positive integer.

In one subembodiment, the operating action is transmitting, the phrase that the first antenna port set and the second antenna port set are related to the target antenna port set respectively comprises: any antenna port of the first antenna port set is spatially related to at least one antenna port of the target antenna port set, and any antenna port of the second antenna port set is spatially related to at least one antenna port of the target antenna port set.

In one subembodiment, the operating action is receiving, the first radio signal and the second radio signal are transmitted by the first terminal and the first base station respectively; second spatial Rx parameter are used for receiving the first radio signal and the second radio signal respectively; the phrase that the first antenna port set and the second antenna port set are related to the target antenna port set respectively comprises: the first spatial Rx parameter and the second spatial Rx parameter are associated to the target antenna port set respectively.

In one subembodiment, the second transceiver 1402 further transmits a first signaling, and receives a second signaling; the first signaling indicates the first antenna port set; the second signaling indicates the second antenna port set; the first signaling comprises a first configuration parameter group, the first configuration parameter group is related to the first radio signal; the second signaling comprises a second configuration parameter group, the second configuration group is related to the second radio signal.

In one subembodiment, the second transceiver 1402 further transmits a third signaling, and receives a fourth signaling; the third signaling indicates the first antenna port set, the fourth signaling indicates the second antenna port set; the third signaling comprises a third configuration parameter group, the third configuration parameter group is related to the first radio signal; the fourth signaling comprises a fourth configuration parameter group, the fourth configuration parameter group is related to the second radio signal.

In one subembodiment, the first transceiver 1401 further receives a third radio signal; the third radio signal is used for generating at least one of the target antenna port set, or the first antenna port set; a transmitter of the third radio signal is the first terminal.

In one subembodiment, the first transceiver 1401 further transmits a fourth radio signal; the fourth radio signal is used for indicating a candidate antenna port set, the candidate antenna port set is a first-type antenna port set of the K1 first-type antenna port set(s), the candidate antenna port set is related to the first antenna port set; or the fourth radio signal is used for indicating a third antenna port set, the third antenna port set is a second-type antenna port set of K2 second-type antenna port set(s), the target antenna port set is related to the third antenna port set; a receiver of the fourth radio signal comprises the first base station.

In one subembodiment, the first transceiver 1401 further receives K2 second-type reference signal(s); the K2 second-type reference signal(s) is(are) transmitted by the K2 second-type antenna port set(s) respectively; a transmitter of the K2 second-type reference signal(s) is the first base station.

In one subembodiment, the first transceiver 1401 further receives first information; the first information is used for indicating K1 first-type time-frequency resource set(s), the K1 first-type time-frequency resource set(s) is(are) occupied by the K1 first-type reference signal(s) respectively; the first information is transmitted via an air interface.

In one subembodiment, the first transceiver 1401 further receives second information; the second information is used for determining a target time unit set, the target time unit set comprises M1 target time unit(s), a first time unit is a target time unit of the M1 target time unit(s); time-domain resources occupied by the first radio signal and the second radio signal belong to the first time unit; the second information is transmitted via an air interface.

In one subembodiment, the first transceiver 1401 comprises at least the former four of a transmitter/receiver 456, a transmitting processor 455, a receiving processor 452 and a controller/processor 490 of Embodiment 4.

In one subembodiment, the second transceiver 1402 comprises at least the former four of a transmitter/receiver 456, a transmitting processor 455, a receiving processor 452 and a controller/processor 490 of Embodiment 4.

In one subembodiment, the first transceiver 1401 comprises at least the former four of a receiver/transmitter 416, a transmitting processor 415, a receiving processor 412 and a controller/processor 440 of Embodiment 4.

In one subembodiment, the first transceiver 1402 comprises at least the former four of a receiver/transmitter 416, a transmitting processor 415, a receiving processor 412 and a controller/processor 440 of Embodiment 4.

Embodiment 15

Figure 15:
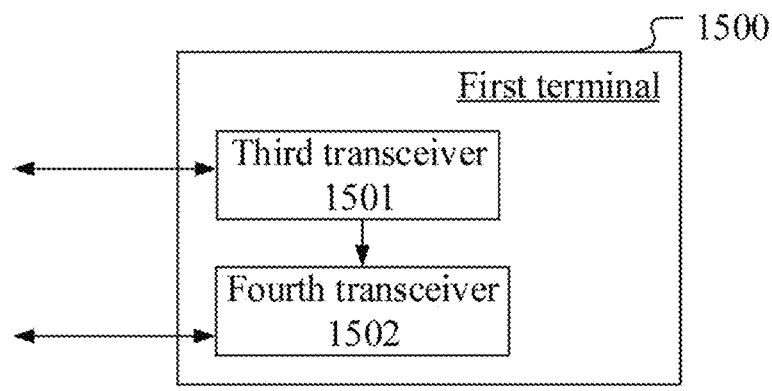
FIG. 15 is a structure block diagram illustrating a processing device in a first terminal according to one embodiment of the present disclosure.

Embodiment 15 illustrates a structure block diagram illustrating a processing device in a first terminal, as shown in FIG. 15. In FIG. 15, a first terminal processing device 1500 includes a third transceiver 1501 and a fourth transceiver 1502.

A third transceiver 1501, receiving K1 first-type reference signal(s); and a fourth transceiver 1502, processing a first radio signal;

in Embodiment 15, the K1 first-type reference signal(s) is(are) transmitted by K1 first-type antenna port set(s) respectively, a target antenna port set is a first-type antenna port set of the K1 first-type antenna port set(s); a first antenna port set is used for transmitting the first radio signal; the first antenna port set is related to the target antenna port set; the processing is receiving, or, the processing is transmitting; the K1 is a positive integer.

In one subembodiment, the processing is receiving, the phrase that the first antenna port set is related to the target antenna port set comprises: any one antenna port of the first antenna port set is spatially related to at least one antenna port of the target antenna port set; a transmitter of the first radio signal is a first node.

In one subembodiment, the processing is transmitting, a first spatial Rx parameter is used for receiving the first radio signal; the phrase that the first antenna port set is related to the target antenna port set comprises: the first spatial Rx parameter is associated to the target antenna port set; a receiver of the first radio signal comprises a first node.

In one subembodiment, the fourth transceiver 1502 further receives a first signaling; the first signaling indicates the first antenna port set, the first signaling comprises a first configuration parameter group, the first configuration parameter group is related to the first radio signal; the first terminal receives the first radio signal.

In one subembodiment, the fourth transceiver 1502 further receives a third signaling; the third signaling indicates the first antenna port set, the third signaling comprises a third configuration parameter group, the third configuration parameter group is related to the first radio signal; the first terminal transmits the first radio signal.

In one subembodiment, the third transceiver 1501 further transmits a third radio signal; the third radio signal is used for generating at least one of the target antenna port set, or the first antenna port set; a receiver of the third radio signal comprises the first node.

In one subembodiment, the third transceiver 1501 comprises at least the former four of a transmitter/receiver 456, a transmitting processor 455, a receiving processor 452 and a controller/processor 490 of Embodiment 4.

In one subembodiment, the fourth transceiver 1502 comprises at least the former four of a transmitter/receiver 456, a transmitting processor 455, a receiving processor 452 and a controller/processor 490 of Embodiment 4.

Embodiment 16

Figure 16:
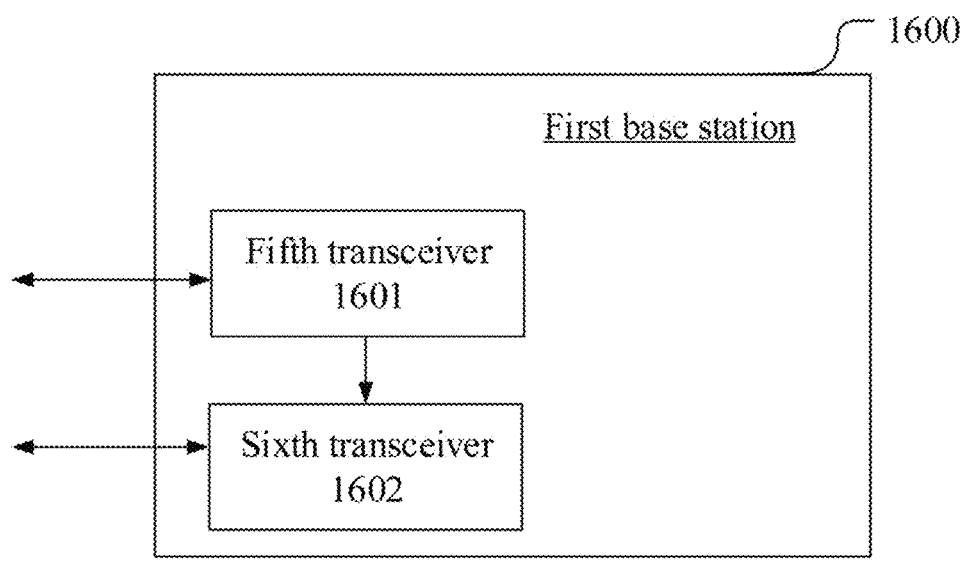
FIG. 16 is a structure block diagram illustrating a processing device in a first base station according to one embodiment of the present disclosure.

Embodiment 16 illustrates a structure block diagram illustrating a processing device in a first base station, as shown in FIG. 16. In FIG. 16, a first base station processing device 1600 includes a fifth transceiver 1601 and a sixth transceiver 1602.

A fifth transceiver 1601, receiving K1 first-type reference signal(s); and a sixth transceiver 1602, processing a second radio signal;

in Embodiment 16, the K1 first-type reference signal(s) is(are) transmitted by K1 first-type antenna port set(s) respectively, a target antenna port set is a first-type antenna port set of the K1 first-type antenna port set(s); a second antenna port set is used for transmitting the second radio signal; the second antenna port set is related to the target antenna port set; the processing is receiving, or, the processing is transmitting; the K1 is a positive integer.

In one subembodiment, the processing is receiving, the phrase that the second antenna port set is related to the target antenna port set comprises: any one antenna port of the second antenna port set is spatially related to at least one antenna port of the target antenna port set.

In one subembodiment, the processing is transmitting, a second spatial Rx parameter is used for receiving the second radio signal; the phrase that the second antenna port set is related to the target antenna port set comprises: the second spatial Rx parameter is associated to the target antenna port set.

In one subembodiment, the sixth transceiver 1602 further transmits a second signaling; the second signaling indicates the second antenna port set, the second signaling comprises a second configuration parameter group, the second configuration parameter group is related to the second radio signal; the first base station receives the second radio signal.

In one subembodiment, the sixth transceiver 1602 further transmits a fourth signaling; the fourth signaling indicates the second antenna port set, the third signaling comprises a third configuration parameter group, the fourth signaling comprises a fourth configuration parameter group; the first base station receives the second radio signal.

In one subembodiment, the fifth transceiver 1601 further receives a fourth radio signal; the fourth radio signal is used for indicating a candidate antenna port set, the candidate antenna port set is a first-type antenna port set of the K1 first-type antenna port set(s), the candidate antenna port set is related to the first antenna port set; or the fourth radio signal is used for indicating a third antenna port set, the third antenna port set is a second-type antenna port set of K2 antenna port set(s), the target antenna port set is related to the third antenna port set; a transmitter of the fourth radio signal is a first node.

In one subembodiment, the fifth transceiver 1601 further transmits K2 second-type reference signal(s); the K2 second-type reference signal(s) is(are) transmitted by the K2 second-type antenna port set(s) respectively; a receiver of the K2 second-type reference signal(s) comprises a first node.

In one subembodiment, the fifth transceiver 1601 further transmits first information; the first information is used for indicating K1 first-type time-frequency resource set(s), the K1 first-type time-frequency resource set(s) is(are) occupied by the K1 first-type reference signal(s) respectively; the first information is transmitted via an air interface; a receiver of the first information comprises a first node.

In one subembodiment, the fifth transceiver 1601 further transmits second information, the second information is used for determining a target time unit set, the target time unit set comprises M1 target time unit(s), a first time unit is a target time unit of the M1 target time unit(s); time-domain resources occupied by the first radio signal and the second radio signal belong to the first time unit; the second information is transmitted via an air interface; a receiver of the second information comprises a first node.

In one subembodiment, the fifth transceiver 1601 comprises at least the former four of a receiver/transmitter 416, a transmitting processor 415, a receiving processor 412 and a controller/processor 440 of Embodiment 4.

In one subembodiment, the fifth transceiver 1602 comprises at least the former four of a receiver/transmitter 416, a transmitting processor 415, a receiving processor 412 and a controller/processor 440 of Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communication, comprising:
   transmitting K1 first-type reference signal(s); and
   transmitting a first radio signal and a second radio signal;
   wherein the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) include a first base station and a first terminal, the first base station and the first terminal are non-co-located; the K1 is a positive integer; the phrase that the first antenna port set and the second antenna port set are related to the target antenna port set respectively comprises: any antenna port of the first antenna port set is spatially related to at least one antenna port of the target antenna port set, and any antenna port of the second antenna port set is spatially related to at least one antenna port of the target antenna port set.

2. The method according to claim 1, comprising:
   transmitting a first signaling; and
   receiving a second signaling;
   wherein the first signaling indicates the first antenna port set; the second signaling indicates the second antenna port set; the first signaling comprises a first configuration parameter group, the first configuration parameter group is related to the first radio signal; the second signaling comprises a second configuration parameter group, the second configuration group is related to the second radio signal.

3. The method according to claim 1, comprising:
   receiving a third radio signal; and
   transmitting a fourth radio signal;
   wherein the third radio signal is used for generating at least one of the target antenna port set, or the first antenna port set; a transmitter of the third radio signal is the first terminal; the fourth radio signal is used for indicating a candidate antenna port set, the candidate antenna port set is a first-type antenna port set of the K1 first-type antenna port set(s), the candidate antenna port set is related to the first antenna port set; or the fourth radio signal is used for indicating a third antenna port set, the third antenna port set is a second-type antenna port set of K2 second-type antenna port set(s), the target antenna port set is related to the third antenna port set; a receiver of the fourth radio signal comprises the first base station; the K2 is a positive integer.

4. The method according to claim 3, comprising:
   receiving K2 second-type reference signal(s);
   wherein the K2 second-type reference signal(s) is(are) transmitted by the K2 second-type antenna port set(s) respectively; a transmitter of the K2 second-type reference signal(s) is the first base station.

5. The method according to claim 1, comprising:
   receiving first information;
   wherein the first information is used for indicating K1 first-type time-frequency resource set(s), the K1 first-type time-frequency resource set(s) is(are) occupied by K1 first-type reference signal(s) respectively; the first information is transmitted via an air interface;
   or, receiving second information;
   wherein the second information is used for determining a target time unit set, the target time unit set comprises M1 target time unit(s), a first time unit is a target time unit of the M1 target time unit(s); time-domain resources occupied by the first radio signal and the second radio signal belong to the first time unit; the second information is transmitted via an air interface; the M1 is a positive integer.

6. A method in a first node for wireless communication, comprising:
   transmitting K1 first-type reference signal(s); and
   receiving a first radio signal and a second radio signal;
   wherein the K1 first-type reference signal(s) is(are) transmitted by K1 first-type antenna port set(s) respectively, a target antenna port set is a first-type antenna port set of the K1 first-type antenna port set(s); a first antenna port set and a second antenna port are respectively used for transmitting the first radio signal and the second radio signal; the first antenna port set and the second antenna port set are related to the target antenna port set respectively; receivers of the K1 first-type reference signal(s) comprise a first base station and a first terminal, the first base station and the first terminal are non-co-located; the K1 is a positive integer; the first radio signal and the second radio signal are transmitted by the first terminal and the first base station respectively; a first spatial Rx parameter and a second spatial Rx parameter are used for receiving the first radio signal and the second radio signal respectively; the phrase that the first antenna port set and the second antenna port set are related to the target antenna port set respectively comprises: the first spatial Rx parameter and the second spatial Rx parameter are associated to the target antenna port set respectively.

7. The method according to claim 6, comprising:
transmitting a third signaling; and
receiving a fourth signaling;
wherein the third signaling indicates the first antenna port set, the fourth signaling indicates the second antenna port set; the third signaling comprises a third configuration parameter group, the third configuration parameter group is related to the first radio signal; the fourth signaling comprises a fourth configuration parameter group, the fourth configuration parameter group is related to the second radio signal.

8. The method according to claim 6, comprising:
receiving a third radio signal; and
transmitting a fourth radio signal;
wherein the third radio signal is used for generating at least one of the target antenna port set, or the first antenna port set; a transmitter of the third radio signal is the first terminal; the fourth radio signal is used for indicating a candidate antenna port set, the candidate antenna port set is a first-type antenna port set of the K1 first-type antenna port set(s), the candidate antenna port set is related to the first antenna port set;
or the fourth radio signal is used for indicating a third antenna port set, the third antenna port set is a second-type antenna port set of K2 second-type antenna port set(s), the target antenna port set is related to the third antenna port set; a receiver of the fourth radio signal comprises the first base station; the K2 is a positive integer.

9. The method according to claim 8, comprising:
receiving K2 second-type reference signal(s);
wherein the K2 second-type reference signal(s) is(are) transmitted by the K2 second-type antenna port set(s) respectively; a transmitter of the K2 second-type reference signal(s) is the first base station.

10. The method according to claim 6, comprising:
receiving first information;
wherein the first information is used for indicating K1 first-type time-frequency resource set(s), the K1 first-type time-frequency resource set(s) (is)are occupied by the K1 first-type reference signal(s) respectively; the first information is transmitted via an air interface;
or, receiving second information;
wherein the second information is used for determining a target time unit set, the target time unit set comprises M1 target time unit(s), a first time unit is a target time unit of the M1 target time unit(s); time-domain resources occupied by the first radio signal and the second radio signal belong to the first time unit; the second information is transmitted via an air interface; the M1 is a positive integer.

11. A first node for wireless communication, comprising:
a first transceiver, transmitting K1 first-type reference signal(s); and
a second transceiver, transmitting a first radio signal and a second radio signal;
wherein the K1 first-type reference signal(s) is(are) transmitted by K1 first-type antenna port set(s) respectively, a target antenna port set is a first-type antenna port set of the K1 first-type antenna port set(s); a first antenna port set and a second antenna port set are respectively used for transmitting the first radio signal and the second radio signal; the first antenna port set and the second antenna port set are related to the target antenna port set respectively; receivers of the K1 first-type reference signal(s) comprise a first base station and a first terminal, the first base station and the first terminal are non-co-located; the K1 is a positive integer; the phrase that the first antenna port set and the second antenna port set are related to the target antenna port set respectively comprises: any antenna port of the first antenna port set is spatially related to at least one antenna port of the target antenna port set, and any antenna port of the second antenna port set is spatially related to at least one antenna port of the target antenna port set.

12. The first node according to claim 11, wherein the second transceiver transmits a first signaling, and the second transceiver receives a second signaling; the first signaling indicates the first antenna port set; the second signaling indicates the second antenna port set; the first signaling comprises a first configuration parameter group, the first configuration parameter group is related to the first radio signal; the second signaling comprises a second configuration parameter group, the second configuration parameter group is related to the second radio signal.

13. The first node according to claim 11, wherein the first transceiver receives a third signaling, and the first transceiver transmits a fourth radio signal; the third radio signal is used for generating at least one of the target antenna port set, or the first antenna port set; a transmitter of the third radio signal is the first terminal; the fourth radio signal is used for indicating a candidate antenna port set, the candidate antenna port set is a first-type antenna port set of the K1 first-type antenna port set(s), the candidate antenna port set is related to the first antenna port set; or the fourth radio signal is used for indicating a third antenna port set, the third antenna port set is a second-type antenna port set of K2 second-type antenna port set(s), the target antenna port set is related to the third antenna port set; a receiver of the fourth radio signal comprises the first base station; the K2 is a positive integer.

14. The first node according to claim 13, wherein the first transceiver receives K2 second-type reference signal(s); the K2 second-type reference signal(s) is(are) transmitted by the K2 second-type antenna port set(s) respectively; a transmitter of the K2 second-type reference signal(s) is the first base station.

15. The first node according to claim 11, wherein the first transceiver receives first information;
wherein the first information is used for indicating K1 first-type time-frequency resource set(s), the K1 first-type time-frequency resource set(s) is(are) occupied by the K1 first-type reference signal(s) respectively; the first information is transmitted via an air interface;
or, the first transceiver receives second information;

wherein the second information is used for determining a target time unit set, the target time unit set comprises M1 target time unit(s), a first time unit is a target time unit of the M1 target time unit(s); time-domain resources occupied by the first radio signal and the second radio signal belong to the first time unit; the second information is transmitted via an air interface; the M1 is a positive integer.

16. A first node for wireless communication, comprising:
a first transceiver, transmitting K1 first-type reference signal(s); and
a second transceiver, receiving a first radio signal and a second radio signal;
wherein the K1 first-type reference signal(s) is(are) transmitted by K1 first-type antenna port set(s) respectively, a target antenna port set is a first-type antenna port set of the K1 first-type antenna port set(s); a first antenna port set and a second antenna port are respectively used for transmitting the first radio signal and the second radio signal; the first antenna port set and the second antenna port set are related to the target antenna port set respectively; receivers of the K1 first-type reference signals comprise a first base station and a first terminal, the first base station and the first terminal are non-co-located; the K1 is a positive integer; the first radio signal and the second radio signal are transmitted by the first terminal and the first base station respectively; a first spatial Rx parameter and a second spatial Rx parameter are used for receiving the first radio signal and the second radio signal respectively; the phrase that the first antenna port set and the second antenna port set are related to the target antenna port set respectively comprises: the first spatial Rx parameter and the second spatial Rx parameter are associated to the target antenna port set respectively.

17. The first node according to claim 16, wherein the second transceiver transmits a third signaling, and the second transceiver receives a fourth signaling; the third signaling indicates the first antenna port set, the fourth signaling indicates the second antenna port set; the third signaling comprises a third configuration parameter group, the third configuration parameter group is related to the first radio signal; the fourth signaling comprises a fourth configuration parameter group, the fourth configuration parameter group is related to the second radio signal.

18. The first node according to claim 16, wherein the first transceiver receives a third signaling, and the first transceiver transmits a fourth radio signal; the third radio signal is used for generating at least one of the target antenna port set, or the first antenna port set; a transmitter of the third radio signal is the first terminal; the fourth radio signal is used for indicating a candidate antenna port set, the candidate antenna port set is a first-type antenna port set of the K1 first-type antenna port set(s), the candidate antenna port set is related to the first antenna port set; or the fourth radio signal is used for indicating a third antenna port set, the third antenna port set is a second-type antenna port set of K2 second-type antenna port set(s), the target antenna port set is related to the third antenna port set; a receiver of the fourth radio signal comprises the first base station; the K2 is a positive integer.

19. The first node according to claim 18, wherein the first transceiver receives K2 second-type reference signal(s); the K2 second-type reference signal(s) is(are) transmitted by the K2 second-type antenna port set(s) respectively; a transmitter of the K2 second-type reference signal(s) is the first base station.

20. The first node according to claim 16, wherein the first transceiver receives first information;
wherein the first information is used for indicating K1 first-type time-frequency resource set(s), the K1 first-type time-frequency resource set(s) is(are) occupied by the K1 first-type reference signal(s) respectively; the first information is transmitted via an air interface;
or, the first transceiver receives second information;
wherein the second information is used for determining a target time unit set, the target time unit set comprises M1 target time unit(s), a first time unit is a target time unit of the M1 target time unit(s); time-domain resources occupied by the first radio signal and the second radio signal belong to the first time unit; the second information is transmitted via an air interface; the M1 is a positive integer.

* * * * *